United States Patent [19]
Fortenbery et al.

[11] Patent Number: 5,910,804
[45] Date of Patent: Jun. 8, 1999

[54] OLE FOR DESIGN AND MODELING

[75] Inventors: Mark D. Fortenbery, Fayetteville, Tenn.; Cameron M. Stubbs, Decatur, Ala.; Dominique J. Payannet, Madison, Ala.; Robert Patience, Huntsville, Ala.

[73] Assignee: Intergraph Corporation, Huntsville, Ala.

[21] Appl. No.: 08/855,775

[22] Filed: May 12, 1997

Related U.S. Application Data

[63] Continuation of application No. 08/378,251, Jan. 23, 1995, Pat. No. 5,682,468.

[51] Int. Cl.$^6$ .................................................. G06T 15/00
[52] U.S. Cl. ........................... 345/419; 395/767; 395/614
[58] Field of Search ........................ 345/418–20, 433–38; 395/500, 600–1, 650, 700, 614–16, 964, 976, 767

[56] References Cited

U.S. PATENT DOCUMENTS

| | | | |
|---|---|---|---|
| 5,467,444 | 11/1995 | Kawamura et al. | 345/433 |
| 5,729,671 | 3/1998 | Peterson | 345/423 |

OTHER PUBLICATIONS

"EDA Licensing—Discusses Software Licensing in the Electronic Design Automation Business", *Electronic News*, Jan. 16, 1995 p. 44.

Nadile, Lisa, "Computervision debuts development platform", "Pelorus Application Development Platform", *PC Week* v12, n2, p. 10(1), Jan. 16, 1995.

"Computervision Launches Design Automation Development Platform for Windows", UNIX Desktop Applications, *PR Newswire*, p0110NE001, Jan. 10, 1995.

"Next stop Jupiter for CADCAM users", "Microsoft is pushing for Intergraph's Jupiter technology to succeed in converting engineers and manufacturers to Windows", *Engineer*, n 7252, p. 24, May 25, 1995.

"CAD/CAM/CAE Consortium Agrees on OLE Specifications", "OLE for Design & Modeling Applications", Silicon Graphics World, v5 n5 p. 5(1) May 1995.

Value in 3–D, *Industry Week*, Jan. 8, 1995, p. 45.

Kempfer, Lisa, "CAD Jumps on Windows 3.1 Bandwagon, (computer–aided design, Microsoft Corp.'s graphical user interface)", *Computer–Aided Engineering*, v12, n11, p. 24(2), Nov., 1993.

Gross, Christian, "What about Windows NT?", (Microsoft Corp's new 32–bit operating system), *Computer–Aided Engineering*, v12, n4, p. 58(3), Apr., 1993.

Prosise, Jeff, "2–D drafting: why pay more?", *PC Magazine*, v12, n4, p. 255(34), Feb. 23, 1993.

Rouse, Nancy E., "CAD Pioneers are Still Trailblazing", *Machine Design*, v59, n25, p. 117(5), Oct. 22, 1987.

"Getting Packaging Specifications on Track", *Food & Drug Packaging*, May 1994, p. 28.

(List continued on next page.)

*Primary Examiner*—Rudolph J. Buchel, Jr.
*Attorney, Agent, or Firm*—Townsend and Townsend and Crew LLP

[57] ABSTRACT

A method for manipulating a first three-dimensional object, in a computer system including a display, a first software application, and a second software application. The present method includes the step of creating a model of the first three-dimensional object with the first software application, which has a first three-dimensional coordinate system. A step of storing the model of the first three-dimensional object in a model format is also included. The present method further includes the step retrieving the model of the first three-dimensional object in the model format into a second software application, the second software application having a second coordinate system. The present method also includes the step of manipulating a view of the model of the first three-dimensional object with the second software application and within the second coordinate system.

52 Claims, 25 Drawing Sheets

OTHER PUBLICATIONS

Mechanical Design Software, "(Buyers Guide)", *Computer–Aided Engineering*, v12, n12, p. 32(4), Dec., 1993.

"Turning PRO", *Cadcam*, v12, n6, p. 33(3), Jun., 1993.

"LINK3D, 2D TO 3D Conversion Announced", *Businesswire*, Mar. 23, 1993.

Foley, James D., et al., "*Computer Graphics: Principles and Practices*", Addison–Wesley Publishing Co., 2nd ed. pp. 201–283, 1990.

Brockschmidt, Kraig, "Inside OLE2", *Microsoft Press*, 1994.

OLE FOR DESIGN AND MODELING

This is a Continuation of application Ser. No. 08/378,251 filed Jan. 23, 1995, now U.S. Pat. No. 5,682,468, the disclosure of which is incorporated by reference.

COPYRIGHT NOTICE

A portion of the disclosure of this patent contains material which is subject to copyright protection. the copyright owner has no objection to the facsimile reproduction by anyone of the patent document or the patent disclosure as it appears in the Patent and Trademark Office patent file or records, but otherwise reserves all copyright rights whatsoever.

BACKGROUND OF THE INVENTION

The present invention relates generally to the area of computer-aided design and computer-aided manufacturing (CAD/CAM) software, and more specifically to methods for enabling the transfer of three-dimensional data between CAD/CAM software applications.

Object Linking and Embedding (OLE) Overview

Within the office environment, one method that has been developed to enable "cutting" and "pasting" of data between software applications is "object linking and embedding (OLE). OLE defines standardized interfaces and functions enabling users to transfer "objects" between software applications. The following section is an abbreviated overview of some of the concepts used in OLE version 2.0, from Microsoft Corporation of Belleview, Wash., and defines some of the terms that will be used in the disclosure. Further information and details about OLE may be obtained from "Inside OLE 2" by Kraig Brockschmidt, 1994, Microsoft Press, hereby incorporated by reference.

An example of cutting and pasting data between software applications is illustrated in FIG. 1. FIG. 1 illustrates a two-dimensional object 1 created in a first software application being transferred into a second software application. The first and second software applications (not shown) are commonly specialized software applications such as spreadsheets, word processors, or graphics programs. Once two-dimensional object 1 has been transferred, the second software application can manipulate its own data, two-dimensional object 2, so that two-dimensional object 2 interacts with two-dimensional object 1. The resulting document is then output to the user.

OLE provides a set of "interfaces", or groups of functions, which when combined provide the mechanics enabling the user to transfer data between programs. FIG. 2 illustrates the convention for representing an OLE interface 10, for an object 11 and a "consumer" 12 of the object. Object 11 is said to have an "interface implementation", including interfaces 13 and 14, that are analogous to an object oriented programming "class." Interfaces 13 and 14 include member functions 15 and 16, respectively, that are analogous to object oriented programming class "instances".

Consumer 12 receives data from object 11 by calling functions of interface 13 and/or interface 14. In some cases the consumer may only be aware of one of several interfaces available in an object. In response to the function calls, object 10 may return specific data about itself to the consumer 12. Object 10, however maintains exclusive control of its own data 17. As further illustrated in FIG. 2, IUnknown is an interface available to all object, that when queried for specific interfaces, returns pointers to the requested interface. For example, assuming consumer 12 knows which functions are available in interface 13, consumer 12 can ask for and receive a pointer to interface 14. Then, once consumer 12 receives a pointer to interface 14, consumer 12 can call member functions 16.

The functions provided in the currently available OLE standardize the transfer of placement and size information, of objects between software applications. Two type of "transferring" objects from a first software application to a second software application include "linking" and "embedding".

"Linking" an object that is created in a first software application to a second software application is when the object maintains its existence separate from the second software application, although the second software application can "use" and reference the object. Linking also allows the user to modify and edit the object with the first software application without having to invoke the second software application.

"Embedding" a first data object into a second software application is when the object is actually integrated with the data stored and used by the second software application. Embedding allows the user to modify and edit the object only after first invoking the second software application.

"Linking" an object is commonly preferred when the linked object includes a large quantity of data. One drawback to linking however, includes maintaining and remembering the particular path or directory of the linked object in the computer memory. "Embedding" an object is commonly preferred when the positioning and relationship of the embedded object to other data within the second software application is important to maintain. One drawback to embedding however, includes that the embedded object cannot be edited or modified by the user without invoking the second software application.

Two other commonly used OLE terms are "servers" and "containers". As illustrated in FIG. 2, the data 17 actually is only a portion of the object 10. The functions 15 and 16 serve to manipulate data 17 and to convey this data to the consumer 12. Because object 10 "serves" and manages the data, it is often called a "server". A "container" is defined as the user of the information contained within the server. In FIG. 2, the container is consumer 12. In a macroscopic scale, in the example in FIG. 1, the server is the first software application which manages object 1, and the container is the second software application. A container may access multiple servers, one for each object within the container's "environment" and further, containers and servers may be nested.

The term "In Place Activation" is another important term in OLE. "In Place" activation enables a first software application to be active within a second software application. As illustrated in FIG. 1, an object 1 created in a spreadsheet application is inserted into a document 2 created by a word processing application. Without In Place activation capability, once object 1 is inserted into document 2, if the user wishes to revise the entries in object 1, normally the user would have to quit the word processing application, enter the spreadsheet application, revise object 1, reinvoke the word processing program and then transfer the revised object 1. This indirect manner of editing transferred object occurs because the software application receiving the object only recognizes the object as a two-dimensional black box. With In Place activation, the user can directly invoke the spread sheet application from within the word processing application. OLE provides the interface capability for the two software applications so they can communicate with each other. As a result, the user can revise object 1 using the spreadsheet application without quitting the word processor application.

OLE version 2.0 is currently available with Microsoft Corporation's Windows™ operating system version 3.1. Currently many office environment software applications such as Microsoft Corporation's Excel and Word support OLE standards and interfaces. As was illustrated in FIG. 1, object 1, created in a first software application such as a spread sheet, is transferred into a second software application such as a word processor. Among other variables passed between the software applications, the second software application needs to know the two-dimensional size of the object 1 so that it can make room for it in the document. The second software application obtains the two-dimensional size of first data object 1 by calling and relying on OLE functions. Based upon the two-dimensional size, the second software application can modify its own data, object 2, to "wrap around" object 1.

OLE is not limited to two-dimensional objects and is also used to incorporate and transfer audio and video data between software applications. Current OLE functions work well with office environment data objects, i.e., two-dimensional objects that are defined by a two-dimensional bounding boxes. OLE functions however, only allow the user to perform rudimentary two-dimensional functions on the boxes such as resizing, locating, and rotating.

CAD/CAM Market Overview

Application software specifically designed for architectural and engineering purposes are commonly labeled Computer Aided Design (CAD) and Computer Aided Manufacturing (CAM) software. Some of the standard features of CAD/CAM applications is the ability to create and manipulate three-dimensional objects and to position three-dimensional objects relative to other three-dimensional objects.

As illustrated in FIG. 3, a three-dimensional object in a CAD/CAM environment is typically represented as a two-dimensional image to the user in the form of a print-out or display. Examples of commonly displayed views of a three-dimensional object are a top, right-side, front, and isometric views. FIG. 3 illustrates that a top view, a right-side view, and a front view of three-dimensional object 20 are derived from orthogonal projections onto a top two-dimensional viewing plane 21, a right-side two-dimensional viewing plane 22, and a front two-dimensional viewing plane 23, respectively. FIG. 3, also illustrates that an isometric view of three-dimensional object 20 is derived from projections onto isometric viewing plane 24.

In the past, CAD/CAM software applications were tightly coupled to specialized computer hardware because of the heavy computational and display demands of the software. Because of this specialization, these CAD/CAM workstations were complete, self-contained working environments. Once the user used one vendor's workstations, there would be little possibility to use another vendor's workstations due to cost considerations. Because the user tended to stay with a particular vendor in the past, there was little need to transfer three-dimensional objects created in a first CAD/CAM application to a second CAD/CAM application.

With the increase in processing capabilities of personal computers, personal computers are now replacing the traditional workstations of the design engineer. This shift in the CAD/CAM computing environment has lessened the ties of the user to a particular vendor and now allows the user to choose the CAD/CAM application that best suits the problem or the user's preferences. In addition, with the increase in computing platforms, more than one engineer can now work on the same problem simultaneously.

Currently, CAD/CAM packages from different vendors rely upon proprietary data formats and do not allow the user to transfer objects created in one software application to another vendor's software application. Thus although computer hardware has become more advanced, the CAD/CAM software has not. What is needed are software functions and tools that enable the user to transfer data objects created by a first CAD/CAM software application into a second CAD/CAM software application.

Currently, if the user attempted to use the present two-dimensional functions of OLE and apply them in the area of CAD/CAM applications, the shape of a three-dimensional object would fail to be transferred. FIG. 4 illustrates a front view 30 of a first three-dimensional object created by a first software application and an isometric view 31 of a second three-dimensional object created by a second software application. Consistent with the OLE standard, front view 30 is defined by a bounding box 32 having dimensions 33 and 34. When front view 30 is transferred to the second software application, the second software application merely sees two-dimensional bounding box 32 and has no understanding of how to integrate the two objects in three-dimensional space. Because office environment concepts of data objects are only two-dimensional objects that are defined by two-dimensional bounding boxes, OLE is ill suited for use in the field of CAD/CAM applications. Further, even if it were somehow possible to transfer the two-dimensional shape of a first three-dimensional object into a second software application, OLE does not provide a mechanism for transferring depth information of an object.

What is needed is a standardized method for allowing the user to transfer three-dimensional data between software applications.

SUMMARY OF THE INVENTION

The present invention provides enhancements and extensions to OLE for the CAD/CAM environment that allows the user to transfer an object created by a first software application to a second software application, while preserving the three-dimensional nature of the object.

DESCRIPTION OF THE PREFERRED EMBODIMENT

Figure 5:
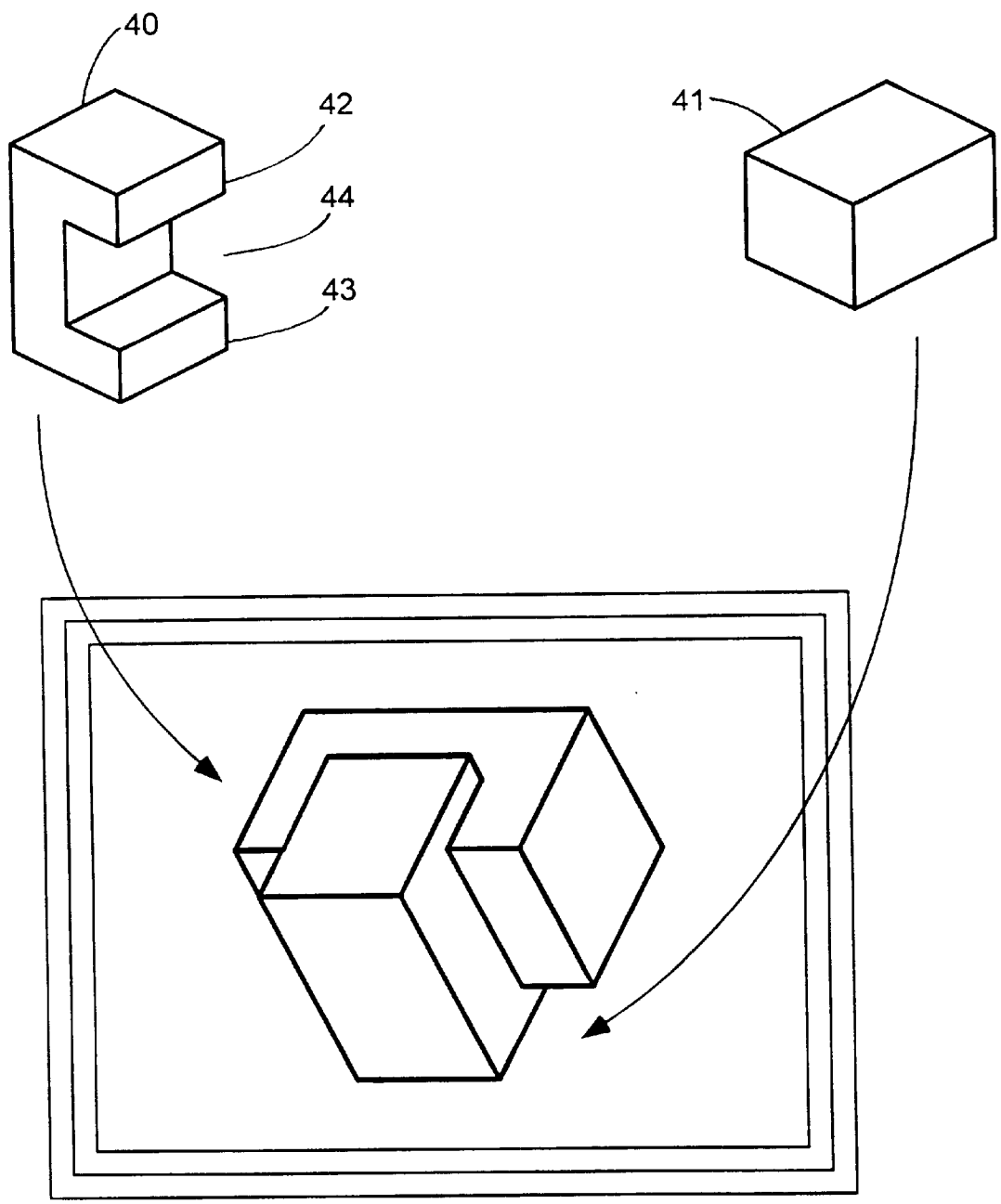
FIG. 5 illustrates that a first three-dimensional object is created with a first software application and a second three-dimensional object is created in a second software application.

One of the objectives of the following OLE extensions is to enable the user to transfer three-dimensional objects between software applications. An example of this is illustrated in FIG. 5. In FIG. 5 a first three-dimensional object 40 is created with a first software application and a second three-dimensional object 41 is created in a second software application. First three-dimensional object 40 includes top leg 42, bottom leg 43, and slot 44. When first three-dimensional object 50 is retrieved into the second software application, the second software application should be able to resize, rotate, and manipulate the first three-dimensional object as one of its own. (However the second software application will still not be able to edit the object.) As illustrated in FIG. 5, first three-dimensional object 40 and second three-dimensional object 41 are both rotated in the three-dimensional coordinate system of the second software application and are assembled. The second software application should be able to recognize the three-dimensional nature of first three-dimensional object 40, by allowing top leg 42 to obscure a portion of second three-dimensional object 41 and by allowing second three-dimensional object 41 to obscure a portion of bottom leg 43.

Figure 6:
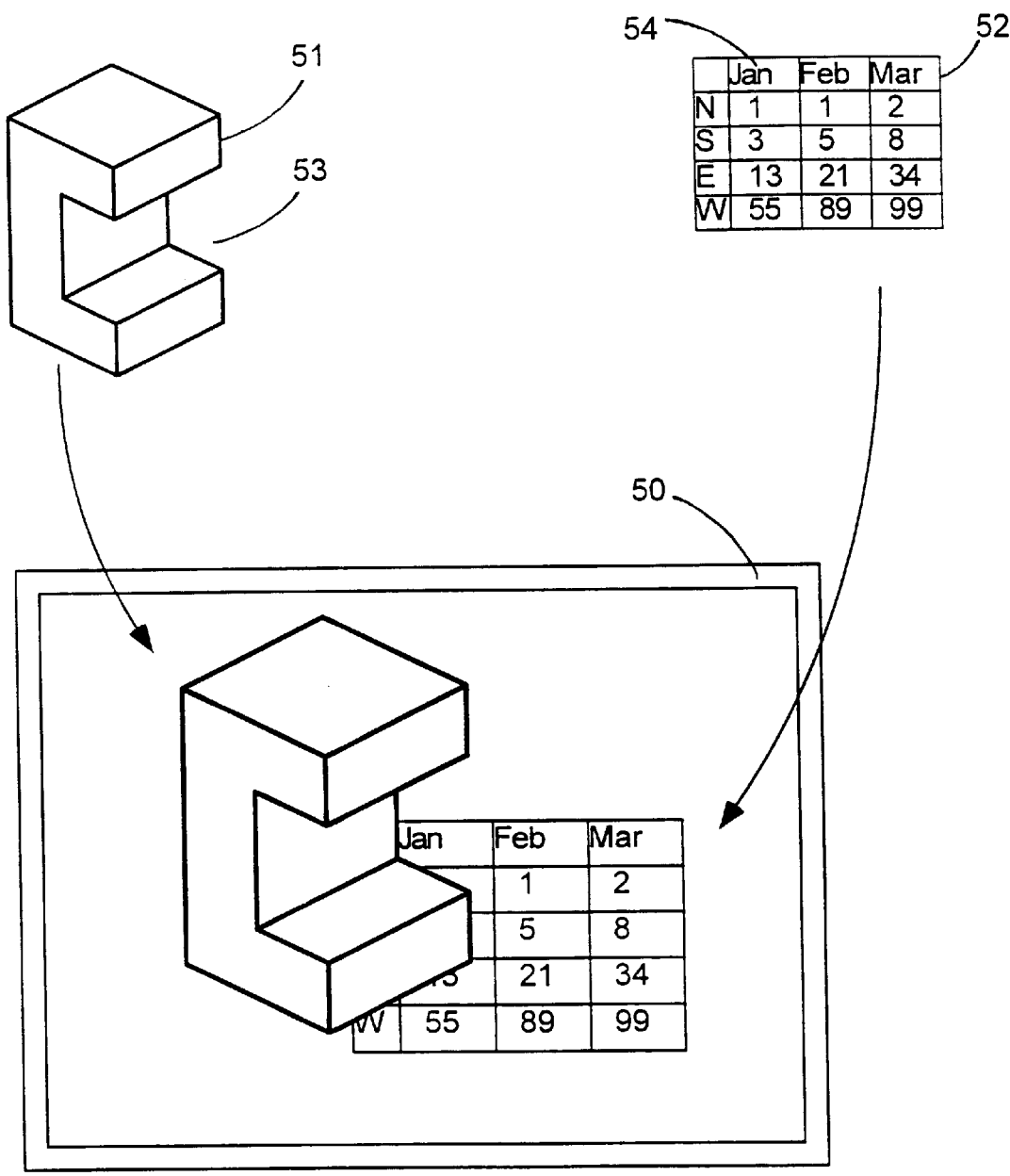
FIG. 6 illustrates the concept of transparency with a display of a three-dimensional object and a two-dimensional object in a three-dimensional coordinate system.

One specific result of the following OLE extensions is to enable three-dimensional objects to have transparent bounding boxes. FIG. 6 illustrates the concept of transparency with a display 50 of a three-dimensional object 51 and a two-dimensional object 52 in a three-dimensional coordinate system. Three-dimensional object 51 includes slot 54 and two-dimensional object 52 includes area 54.

The Current OLE enables the user to transfer two-dimensional "black boxes" of information without regard to the contents of the box. If a first three-dimensional object is returned into the second software application, the second-software application should receive the actual shape of the three-dimensional object, and not obscure more of the image than necessary when transferred. As illustrated in FIG. 6, with the following OLE extensions the second software application recognizes that slot 53 allows the user to see through object 51, i.e. object 51 is transparent in slot 53, and thus the underlying two-dimensional object 52 remains visible in area 54.

In sum, adding the following described extensions to OLE provides the following capability 1) enabling the communication between three-dimensional objects, servers, and containers, as well as enabling communication between two-dimensional containers and three-dimensional objects and servers, and enabling communication between three-dimensional containers and two-dimensional objects; 2) enabling three-dimensional servers to navigate within a two or three-dimensional container environment, including enabling multiple In Place active views; and 3) enabling three-dimensional objects to interact with other objects within the container environment.

It is believed that one familiar with OLE, as described in "Inside OLE 2" by Kraig Brockschmidt, would be able to readily use the following OLE extensions based upon the following disclosure. Further details about the preferred method of enabling such transfer of data are detailed in the following sections.

System Overview

Figure 7:
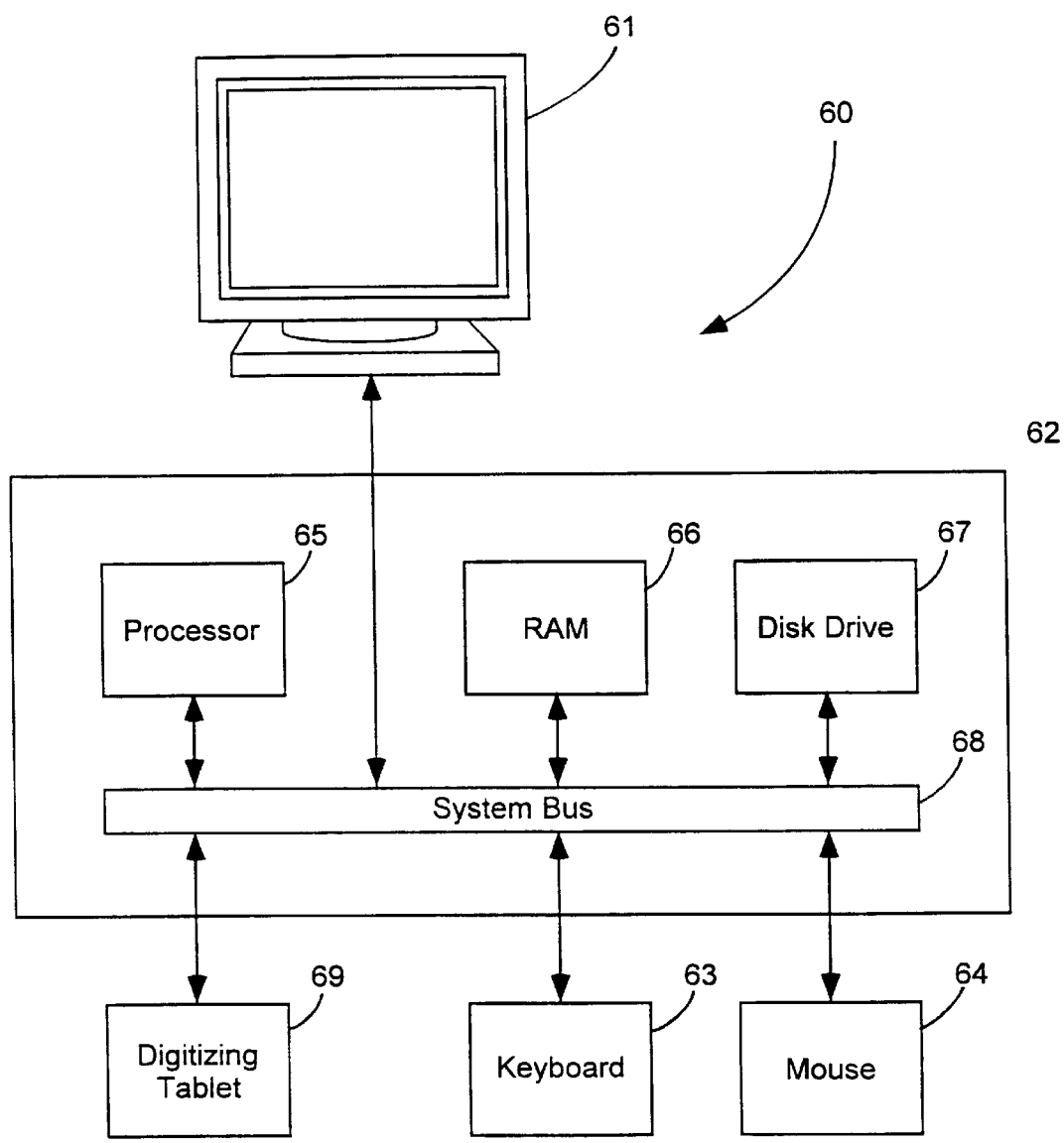
FIG. 7 is a block diagram of a system according to a preferred embodiment of the present invention.

FIG. 7 is a block diagram of a system 60 according to a preferred embodiment of the present invention. System 60 includes a display monitor 61, a computer 62, a keyboard 63, and a mouse 64. Computer 62 includes familiar computer components such as a processor 65, and memory storage devices such as a random access memory (RAM) 66, a disk drive 67, and a system bus 68 interconnecting the above components. Mouse 64 is but one example of a graphical input device, a digitizing tablet 65 is an example of another.

In a preferred embodiment, system 60 includes a IBM PC compatible personal computer, running Windows™ operating system Version 3.1 and OLE 2.0 by Microsoft Corporation, and Avalon™ software, currently under development by Intergraph Corporation. The appendix includes preferred embodiments of the Avalon™ OLE extensions described below, written in Visual C++. The appendix also includes sample source code programs that incorporate the Avalon™ OLE extensions.

FIG. 7 is representative of but one type of system for embodying the present invention. It will be readily apparent to one of ordinary skill in the art that many system types and configurations are suitable for use in conjunction with the present invention.

Three-Dimensional Extensions to OLE

0. Type Definitions
1. Interfaces Enabling Three-Dimensional Object Handling
   1.1. IOle3DObject interface
   1.2. IViewGLObject interface
   1.3. IOleInPlace3DObject interface
2. Interfaces Enabling Navigation of A Container Environment
   2.1. IOleInPlace3DSite interface
   2.2. IOleInPlaceViews interface
   2.3. IOleInPlaceActive3DObject interface
3. Interfaces Enabling Three-Dimensional Object Interaction
   3.1. IOleLocate interface

0. Type Definitions

The following are type definitions, described in the preferred embodiment in C++, used in the descriptions of the preferred embodiment of the formal OLE extension interfaces.

```
tagDVREP is used to specify how the object is displayed to the
user.
typedef enum tagDVREP  {                // Standard representations
    DVREP_CONTENT = 1,                  // display all the details of the
                                           object
    DVREP_SIMPLIFIED = 2,               // display a simplified version
    DVREP_SYMBOL = 4,                   // display as a symbol
    DVREP_TEXT = 8                      // display only the text description
} DVREP;
    EXTENT3D is a list of coordinates defining the range of the
object in three-dimensions.
// Extent definition
typedef double* EXTENT3D;               // Low point, and High points (6
                                           doubles)
typedef EXTENTthree-dimensional LPEXTENT3D;
    Clipping plane equations are a set of four points in space
that define a plane, which in turn defines a boundary in space.
// Clipping plane equations
typedef double* CLIPPLANEEQUATION;      // 6 plane equations complying with GL
format (24 doubles)
typedef CLIPPLANEEQUATION LPCLIPPLANES;
    XFORM3D is a matrix used for conveying parameters to the
three-dimensional rendering utility.
// XForm matrix
typedef double* XFORM3D;                // Matrix of 16 doubles complying with
                                           GL format
typedef XFORMthree-dimensional LPXFORM3D;
```

1. Interfaces Enabling Three-Dimensional Object Handling

The new OLE interfaces as described herein allow containers and servers, both which manipulate three-dimensional objects, to take advantage of the third dimension while maintaing backwards capability. Specifically, the new interfaces allow two-dimensional objects to be inserted into three-dimensional containers and three-dimensional objects into two-dimensional containers. Manipulation of an object however, still does not add the capability of editing a transferred object.

Hereinafter, unless specified, the term "container" refers to a container that supports either two-dimensional or three-dimensional objects, and the term "object" refers to a three-dimensional object or a two-dimensional object.

1.1 IOle3DObject Interface

The IOle3DObject interface is an extension of the existing OLE IoleObject interface and allows a three-dimensional container to retrieve three-dimensional information about an object. IOle3DObject functions are used in the same programming context as the IOleObject functions, with added functionality described below. The IOle3DObject interface also allows a two-dimensional container that understands three-dimensions to specify and retrieve a view of a three-dimensional object.

Figure 8:
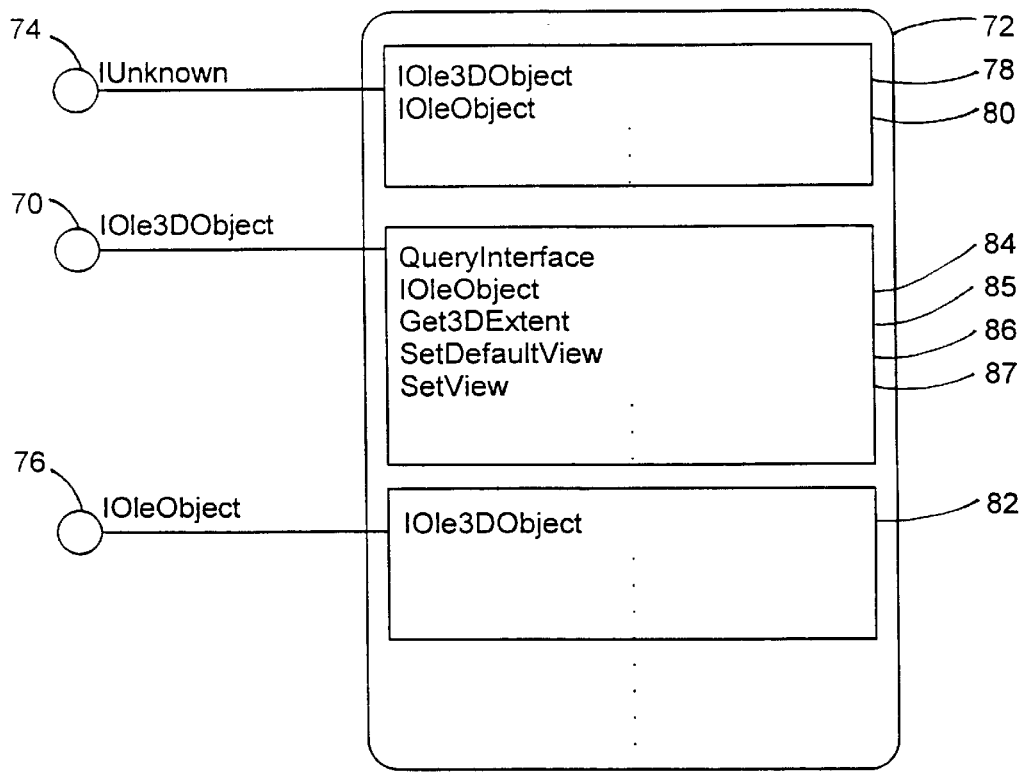
FIG. 8 illustrates the IOle3DObject interface in a user interface of an object.

FIG. 8 illustrates the IOle3DObject interface 70 in a user interface 72 of an object. User interface 72 includes an IUnknown interface 74 that is available in all OLE objects, and an IOleObject interface 76 that is also available in all OLE objects. IUnknown interface 74 includes an interface implementation having a function 78, that when called returns a pointer to Iole3dObject interface 70 if the object is a three-dimensional object and a function 80, that when called returns a pointer to IOleObject interface 76. IOleObject interface 76 includes an implementation having a function 82 that when called returns a pointer to IOle3dObject interface 70 if the object is a three-dimensional object. IOle3DObject interface 70 includes an implementation having functions 84, 86, 88, 90, and 92, which are described below.

Figure 9:
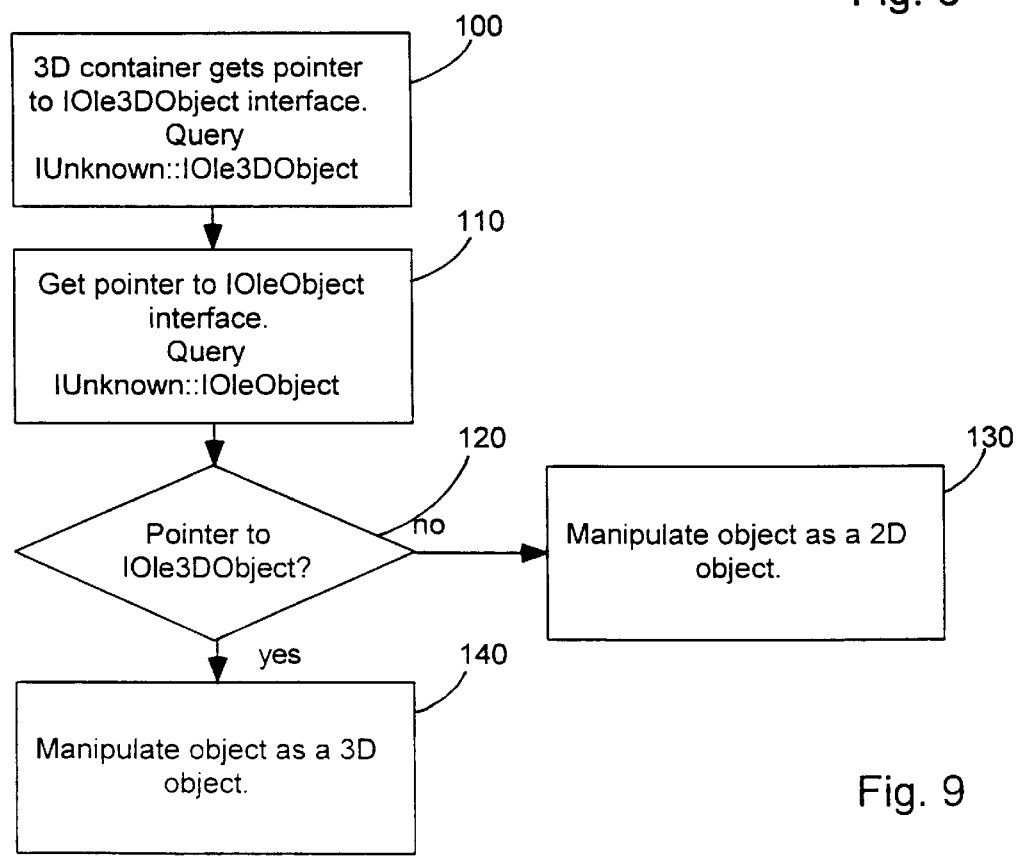
FIG. 9 is a flow diagram of one embodiment of the process of determining whether the object is a three-dimensional object.

FIG. 9 is a flow diagram of one embodiment of the process of determining whether the object is a three-dimensional object.

During initialization of an object, (e.g., creating or loading an object) the container queries IUnknown function 78 for a pointer to IOle3DObject interface 70 (step 100). At the same time, the container queries IUnknown function 80 for a pointer to IOleObject interface 76 in case the object is not a three-dimensional object (step 110).

In a preferred embodiment, the container further queries IOleObject function 82 for a pointer to IOle3DObject interface 70. Once IOle3DObject interface 70 is located, the container queries IOle3DObject function 84 and ensures there is a pointer to IOleObject interface 76.

If the query of IOleObject function 82 or IUnknown function 78 return a NULL pointer (step 120), the object is not a three-dimensional object and the container must treat the object as a two-dimensional object (step 130). If the above queries return a pointer to IOle3DObject interface 70 the container can treat the object as a three-dimensional object (step 140).

In practical terms, if a first software application creates a three-dimensional object using the OLE IOle3DObject interface extensions described herein, a second software application, will then be able to call IOle3DObject functions to obtain three-dimensional data about the object.

The following is a description of the preferred embodiment of the formal IOle3DObject interface:

```
interface IOle3DObject : IUnknown {
    // * IUnknown methods * //
    HRESULT QueryInterface (REFIID riid, LPVOID FAR* ppvObj);
    ULONGAddRef ();
    ULONGRelease ();
    // * IOle3DObject methods * //
    HRESULT Get3DExtent    (DVREP dwRep, LPEXTENTthree-
                            dimensional pExtent);
```

```
    HRESULT GetDefaultView (LPXFORMthree-dimensional pvToW,
                            LPXFORMthree-dimensional pWToV,
                            WORD wPlaneCnt,
                            LPCLIPPLANES pClip);
    HRESULT SetView        (LPXFORMthree-dimensional pVToW,
                            LPXFORMthree-dimensional pWToV,
                            WORD wPlaneCnt, LPCLIPPLANES
                            pClip);
};
```

1.1.1. IOle3DObject::Get3DExtent

The first IOle3DObject function Get3DExtent returns the "extents" (or range) of an object in three-dimensions in response to being called by a container. This function is roughly analogous to the current OLE function IOleObject::GetExtent except a third dimension is included. An object that supports the IOle3DObject interface must also support the IoleObject interface in order to be backwards compatible with two-dimensional containers.

Before the Get3DExtent function is called, the container must first calculate an "attachment" matrix. An attachment matrix is a mapping between a three-dimensional object's system to the container's system, as illustrated in FIGS. 10a and 10b.

Figures 10A, 10B:
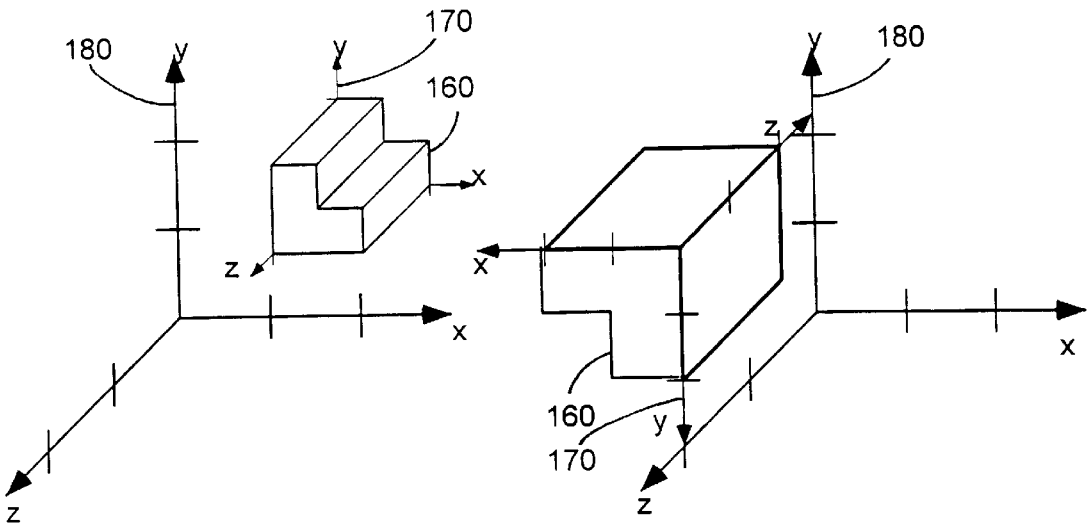
FIGS. 10a and 10b illustrate two different orientations of an object with regard to its own coordinate system and with regard to a container's coordinate system.

FIGS. 10a and 10b illustrate two different orientations of an object 160 with regard to its own coordinate system 170 and with regard to a container's coordinate system 180. As illustrated, the object 160 can be moved, rotated, and resized in three dimensions with respect to coordinate system 180. The size and orientation of object 160 relative to its own coordinate system 170 however remains constant. The container keeps track of the positioning and size of object 160 within its coordinate system 180 by calculating and maintaining an attachment matrix that maps coordinate system 170 to coordinate system 180.

Figures 11A, 11B:
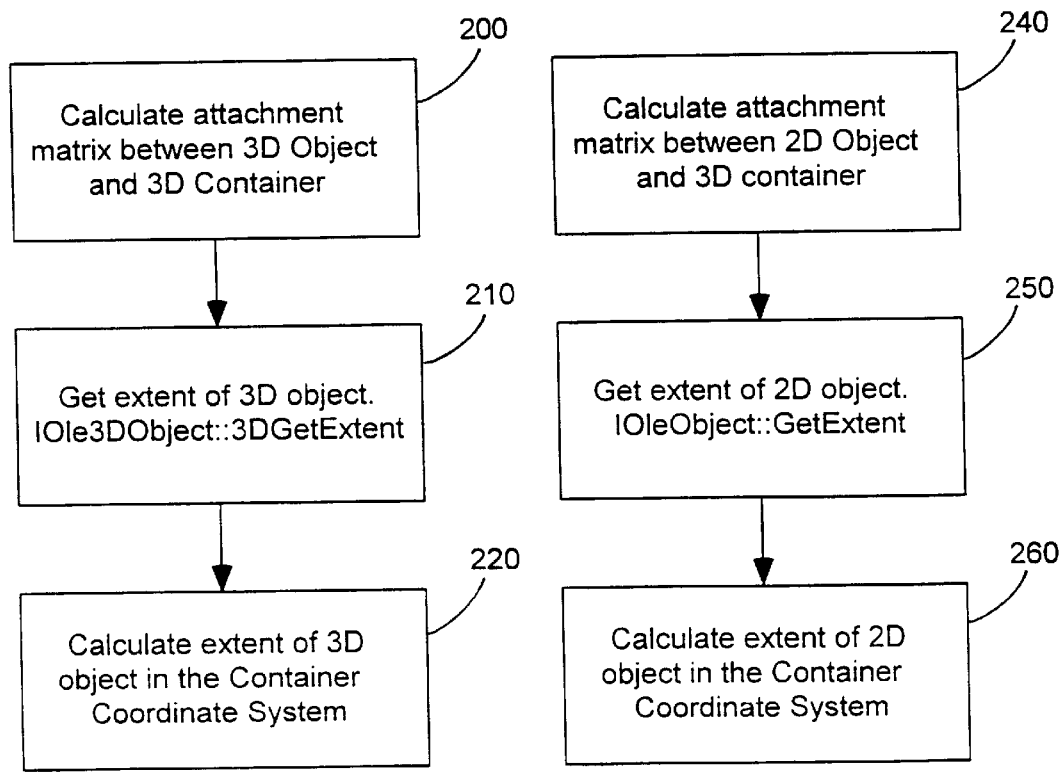
FIGS. 11a and 11b are flow diagrams of one embodiment of the process of determining the actual extent of a three-dimensional object within a container using IOle3DObject::Get3DExtent.

FIGS. 11a and 11b are flow diagrams of one embodiment of the process of determining the actual extent of a three-dimensional object within a container using IOle3DObject::Get3DExtent.

In FIG. 11a, for a container to calculate the actual size of an object within the container's coordinate system, an attachment matrix is first calculated (step 200).

Once the attachment matrix is calculated, the container calls IOle3DObject::Get3DExtent (step 210). As just described with FIGS. 10a and 10b, although a container manipulates the view of the object within the container's coordinate system, the object maintains its relationship to its own coordinate system. In response to the function call Get3DExtent, the server returns the extent, or range, of the object relative to its own coordinate system.

Once the attachment matrix and the extent of the object have been determined, the container then calculates the extent of the object within the container's coordinate system (step 220), in the preferred embodiment by multiplying the attachment matrix to the extent values.

In the situation where the object is two-dimensional and the container is three-dimensional, the extents of the object can still be calculated, as illustrated in FIG. 11b. An attachment matrix is first calculated in step 240.

Once this attachment matrix has been calculated, the container calls the standard OLE function IOleObject::GetExtent (step 250). In response to this function call, the server returns the two-dimensional extent of the object relative to its own coordinate system. Next, the container calculates the actual extent of the object within the container's coordinate system (step 260), in the preferred embodiment by multiplying the attachment matrix to the extent values.

Figure 12:
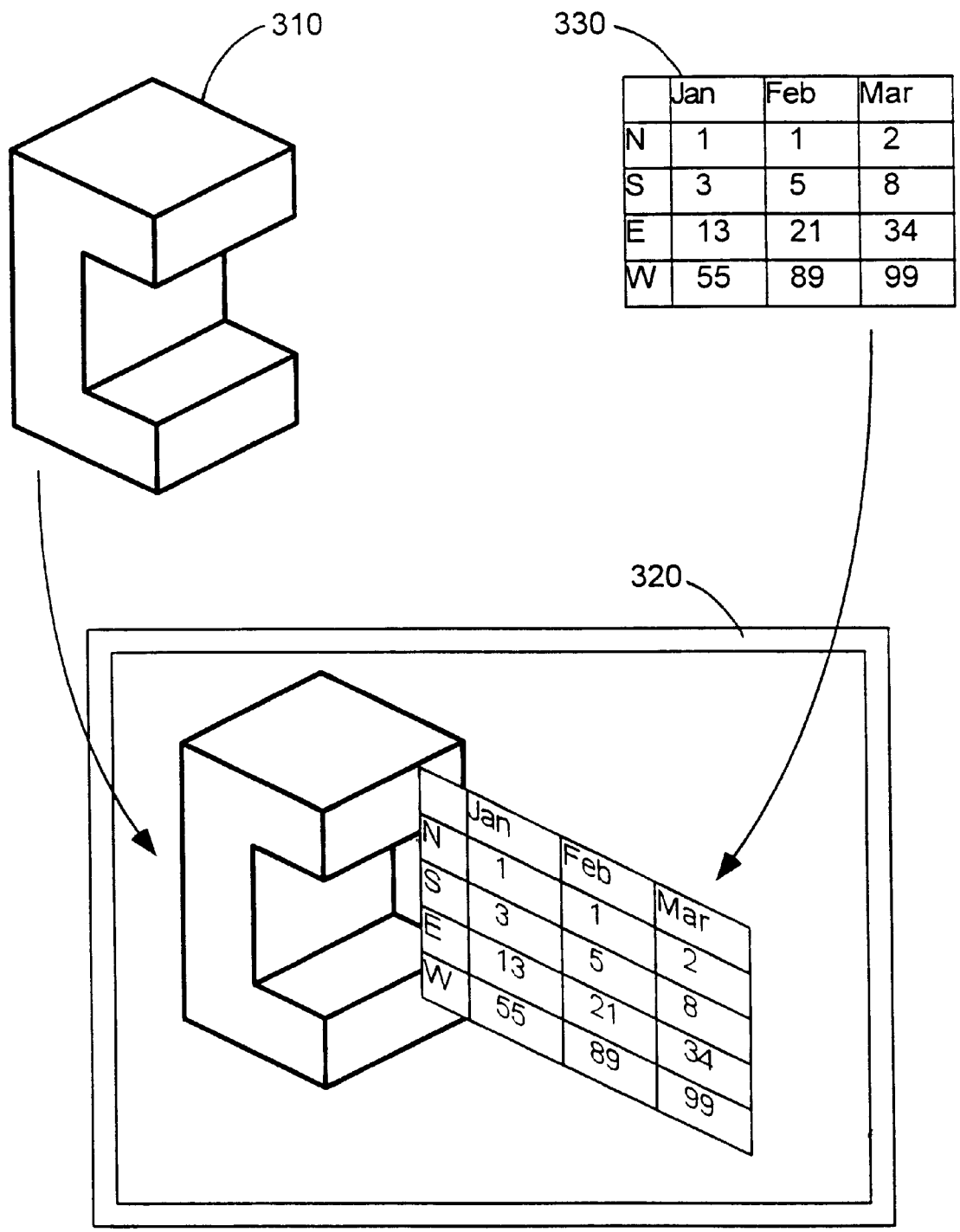
FIG. 12 illustrates that a three-dimensional object 310 and a two-dimensional object are inserted into in a three-dimensional container.

The implications of mapping a two-dimensional object into a three-dimensional container are illustrated in FIG. 12. In FIG. 12, a three-dimensional object 310 and a two-dimensional object 320 are inserted into in a three-dimensional container. The original two-dimensional object 330 is also illustrated. Because a two-dimensional object is mapped into three-dimensional space, the object can be manipulated in three dimensions by the container and can interact with other objects such as three-dimensional object 310.

The following is a description of the preferred embodiment of the formal Get3DExtent interface:
IOle3DObject::Get3DExtent
HRESULT IOle3DObject:: Get3DExtent (DWORD dwRep, LPEXTENTthree-dimensional pExtent)
Returns the three-dimensional extent of a three-dimensional object, depending on its representation.

Once the container determines it can support a three-dimensional object, the container retrieves a two-dimensional view of the object.

Figure 14:
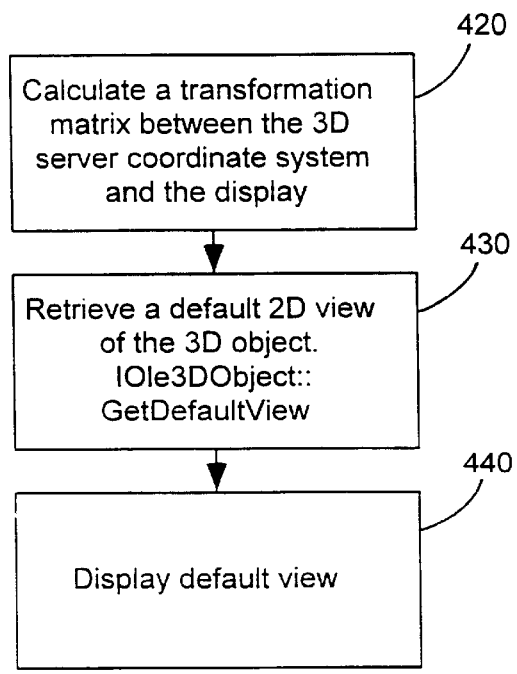
FIG. 14 illustrates a flow diagram of one embodiment of the process of a two-dimensional container calling GetDefaultView to display a default view of a three-dimensional object.

FIG. 14 illustrates a flow diagram of one embodiment of the process of a two-dimensional container calling GetDefaultView to display a default view of a three-dimensional object.

Before the GetDefaultView function is called, the container must first calculate a "transformation" matrix between the server's three-dimensional coordinate system and the display's two-dimensional coordinate system. Another term used for this matrix is a "server world to view" matrix, where the server world is the object's coordinate system and the "view" is the display's coordinate system.

In FIG. 14, for a server to determine the display position of the default view of the object on the display, the "transformation matrix" is first calculated (step 420).

Once the transformation matrix is calculated, the container calls IOle3DObject::GetDefaultView (step 430) and passes the transformation matrix to the server. Based upon

| Argument | Type | Description |
| --- | --- | --- |
| dwRep | DVREP | Type of representation requested. It is an extension of the two-dimensional aspect of IOleObject::GetExtent. This argument is a DVREP type. |
| pExtent | LPEXTENT3D | Array of 6 doubles representing the low and high points of the object expressed in the server coordinate system. |
| return value | S_OK | The extent is returned successfully. |
| E_INVALIDARG | | One of the arguments is invalid. |
| E_OUTOFMEMORY | | Out of memory. |
| E_UNEXPECTED | | An unexpected error happened. |

1.1.2 IOle3DObject::GetDefaultView

The next IOle3DObject function GetDefaultView specifically provides a two-dimensional container the ability to retrieve a predefined view of a three-dimensional object. As was illustrated in FIG. 3, a three-dimensional object is typically viewed as a two-dimensional object on a viewing plane. One view such as front view 23, is further predefined as a default view.

Figure 13:
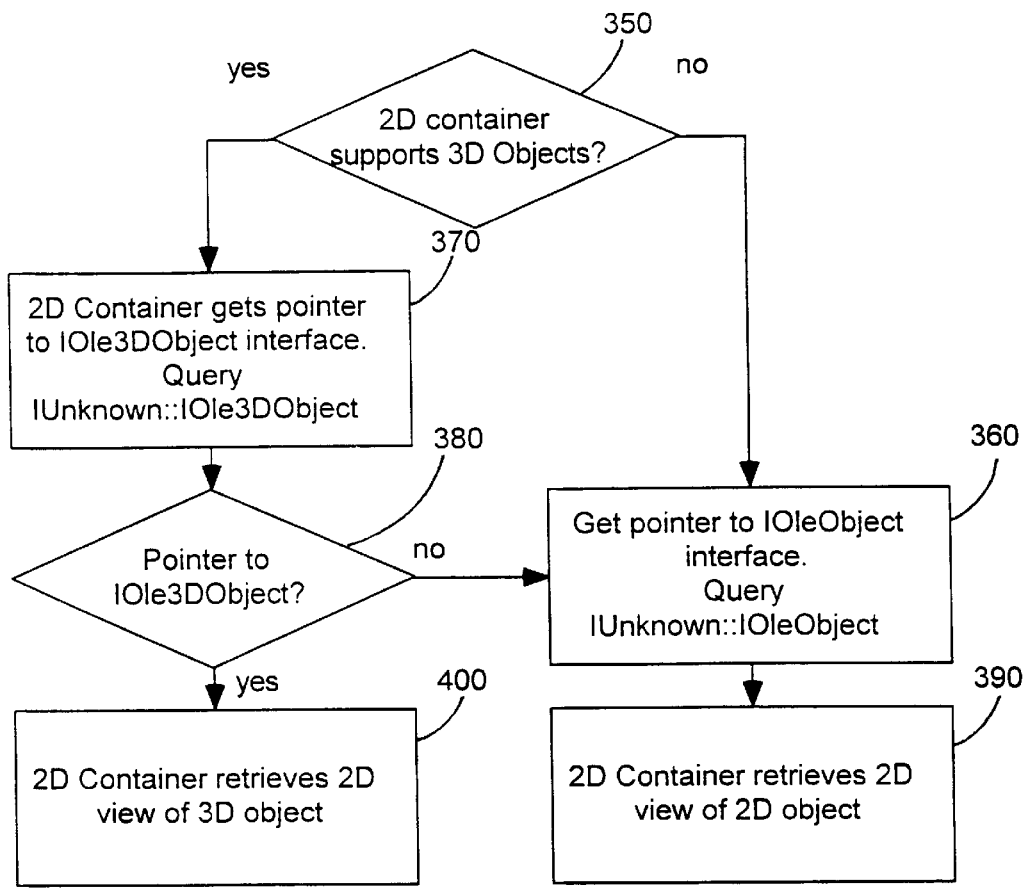
FIG. 13 is a flow diagram of one embodiment of the process of determining whether a two-dimensional container can retrieve a view of a three-dimensional object.

FIG. 13 is a flow diagram of one embodiment of the process of determining whether a two-dimensional container can retrieve a view of a three-dimensional object.

If a two-dimensional contain3er does not support three-dimensional objects, i.e. is not aware of the IOle3DObject interface, the two-dimensional container queries IUnknown function 76 in FIG. 7 for a pointer to IOleObject interface 76 (steps 350 and 360). If the two-dimensional container supports three-dimensional objects, the two-dimensional container queriess IUnknown function 78 for a pointer to IOle3DObject interface 70 (steps 350 and 370).

If the query of IUnknown function 78 returns a NULL pointer (step 380), the object is not a three-dimensional object and the container treats the object as a conventional two-dimensional object. When either the object is two-dimensional, or the container does not support a three-dimensional object, the container retrieves a conventional two-dimensional view of the object (step 4390). If the query in step 380 returns a pointer to IOle3DObject interface 70 the container treats the object as a three-dimensional object (step 400).

the transformation matrix, the server displays a default view of the object to the display (step 440). The actual process of a server displaying the object will be discussed later in this disclosure.

Figure 15:
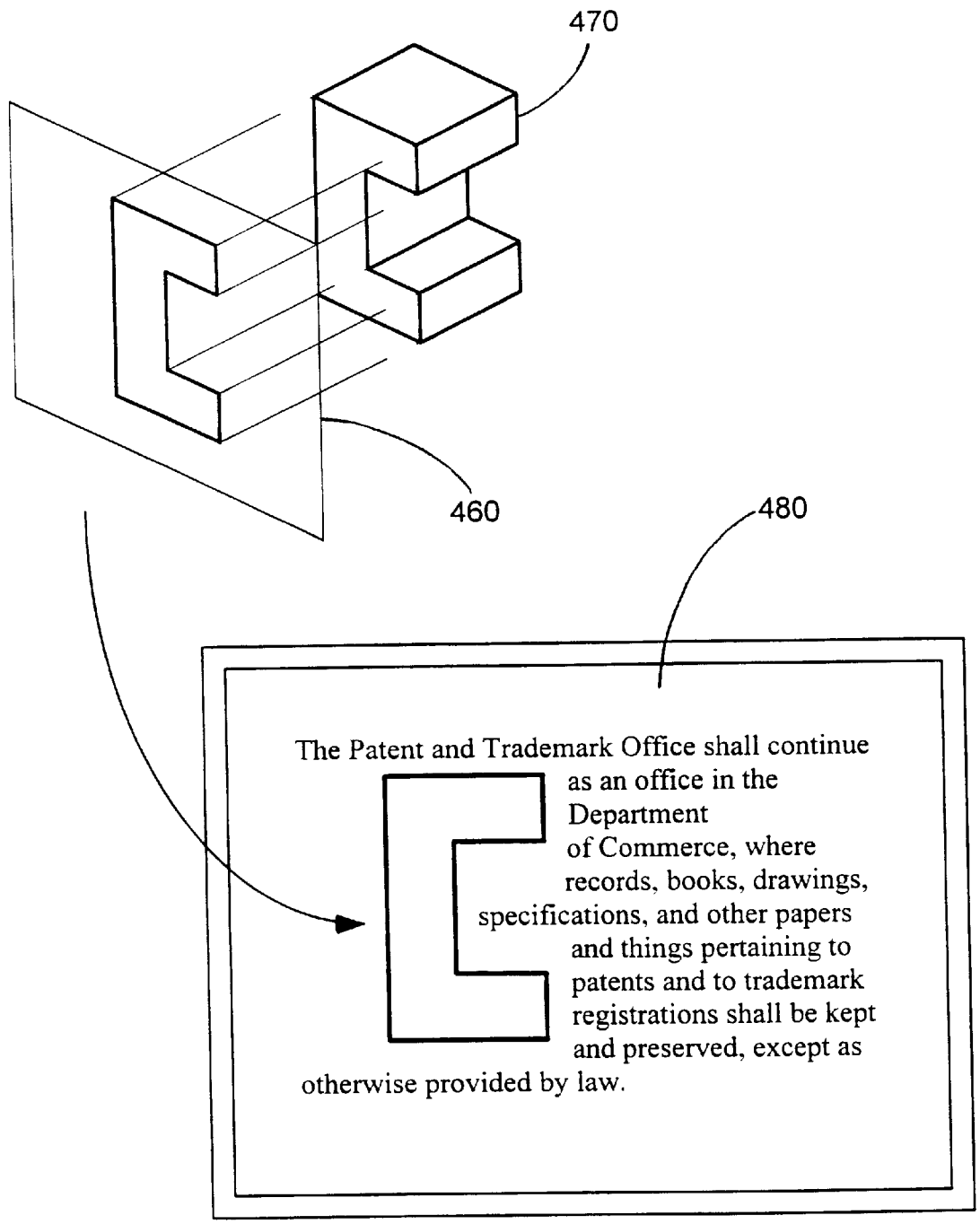
FIG. 15 illustrates a default view (the front view) of a three-dimensional object is inserted into a two-dimensional container.

The result of a two-dimensional container retrieving a default view of a three-dimensional object and displaying it is illustrated in FIG. 15. In FIG. 15 a default view 460 (the front view) of a three-dimensional object 470 is inserted into a two-dimensional container. After the container retrieves the three-dimensional object and passes the transformation matrix to the server, the server calculates and displays default view 460 to the display. The actual process of a server displaying the object will be discussed later in this disclosure. Because the container is also aware of the transformation matrix and positioning of the object, as illustrated, the container can then manipulate its data 480 to interact with default view 460.

The actual display position of the three-dimensional object in the container is governed by the variable lprcPosRect returned by the function call OleInPlaceSite::GetWindowContext as described in "Inside OLE 2" described above.

The following is a description of the preferred embodiment of the formal GetDefaultView interface:

| | | |
|---|---|---|
| IOle3DObject::GetDefaultView | | |
| HRESULT IOle3DObject ::GetDefaultView | (LPXFORM3D* ppVToW, LPXFORM3D* ppWToV, WORD* pwPlaneCnt, LPCLIPPLANES* ppClip) | |

Returns the default view with which a server displays.

| Argument | Type | Description |
|---|---|---|
| ppVToW | LPXFORM3D* | Matrix representing the View to Server World (pixel to three-dimensional (real world) coordinate system) Transformation Matrix. This matrix is a 4x4 matrix as described in OpenGL view matrices. It includes Rotation, Translation, Scale, Perspective and shearing information. |
| ppWtoV | LPXFORM3D* | Matrix representing the Server World to View Transformation Matrix. This matrix is a 4x4 matrix as described in OpenGL view matrices. It includes Rotation, Translation, Scale, Perspective and shearing information. This is the inverse of the pVtoW argument without perspective or projections. |
| pwPlaneCnt | WORD* | Number of clipping planes used to display. This number can vary between 0 and 6. When the number is 0, the pointer to the clipping planes equations can be null. |
| ppClip | LPCLIPPLANES* | Equations of the clipping planes expressed into the Object coordinate system. Each clipping plane is represented by the 4 coefficients of the plane equation. There is a maximum of 6 clipping planes; this is an array of 24 doubles. The definition of the clipping planes is the same as in OpenGL. |
| return value | S_OK | The display context is returned successfully. |
| E_INVALIDARG | | One of the arguments is invalid. |
| E_OUTOFMEMORY | | Out of memory. |
| E_UNEXPECTED | | An unexpected error happened. |

1.1.3 IOle3DObject::SetView

Figure 1:
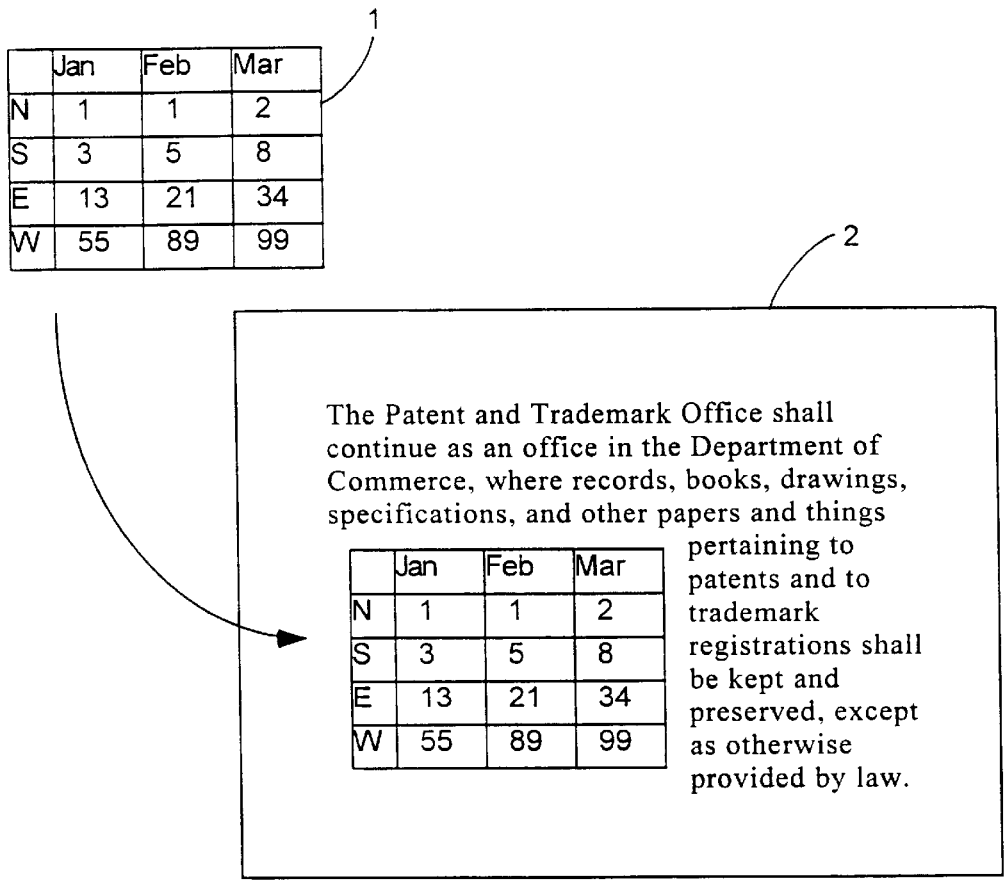
FIG. 1 illustrates a two-dimensional object 1 created in a first software application being transferred into a second software application.
Figure 2:
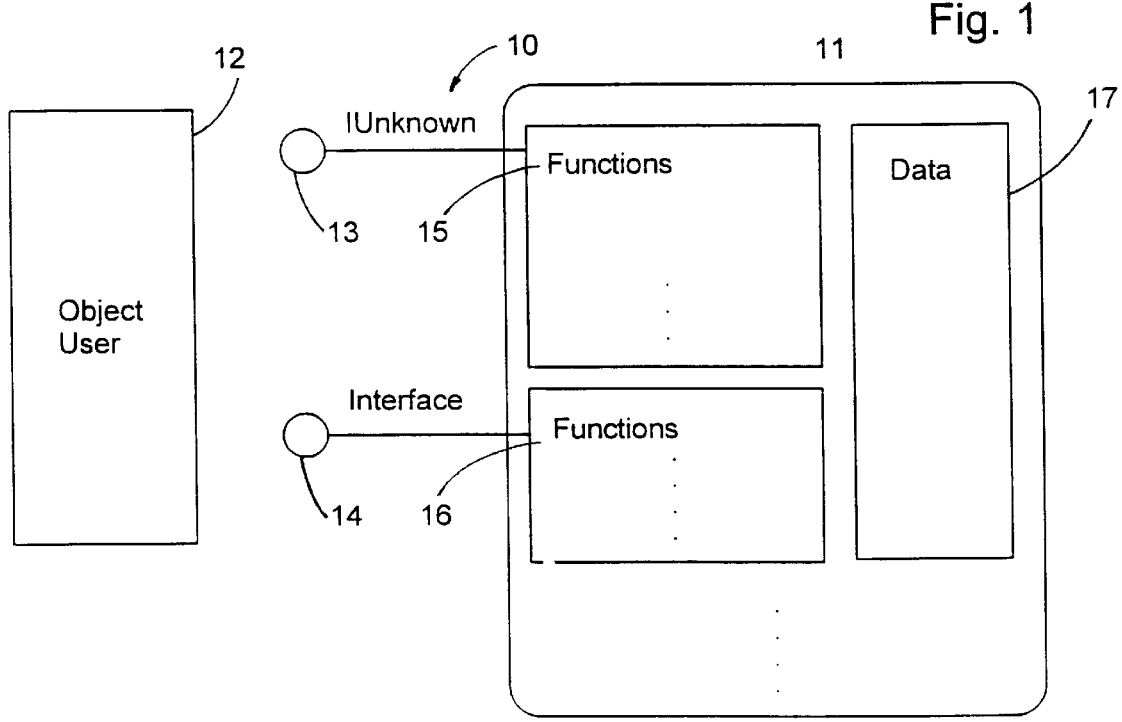
FIG. 2 illustrates the convention for representing an OLE interface, for an object and a "consumer" of the object.
Figure 3:
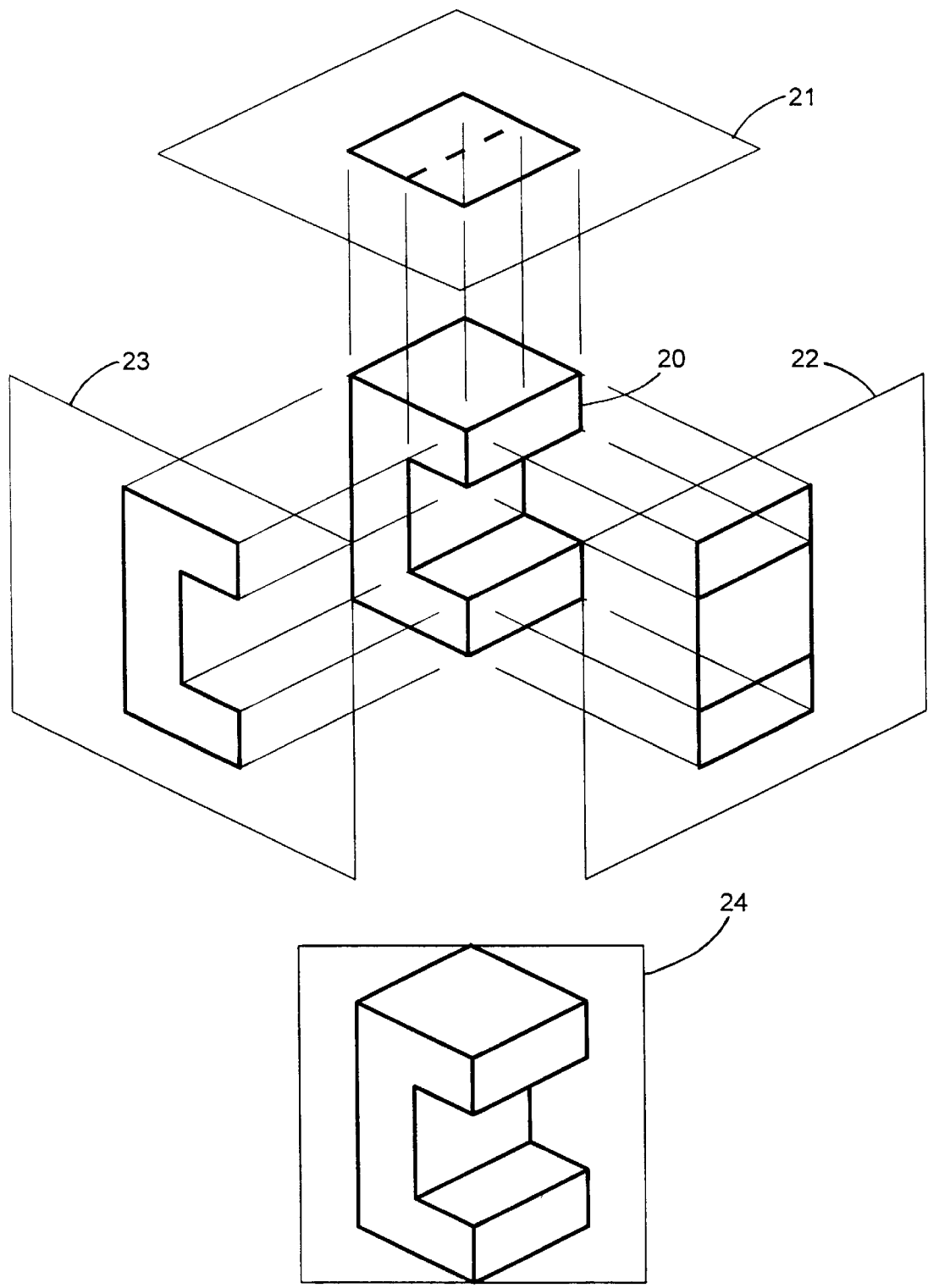
FIG. 3 illustrates that a top view, a right-side view, and a front view of three-dimensional object are derived from orthogonal projections onto a top two-dimensional viewing plane, a right-side two-dimensional viewing plane, and a front two-dimensional viewing plane, respectively.
Figure 4:
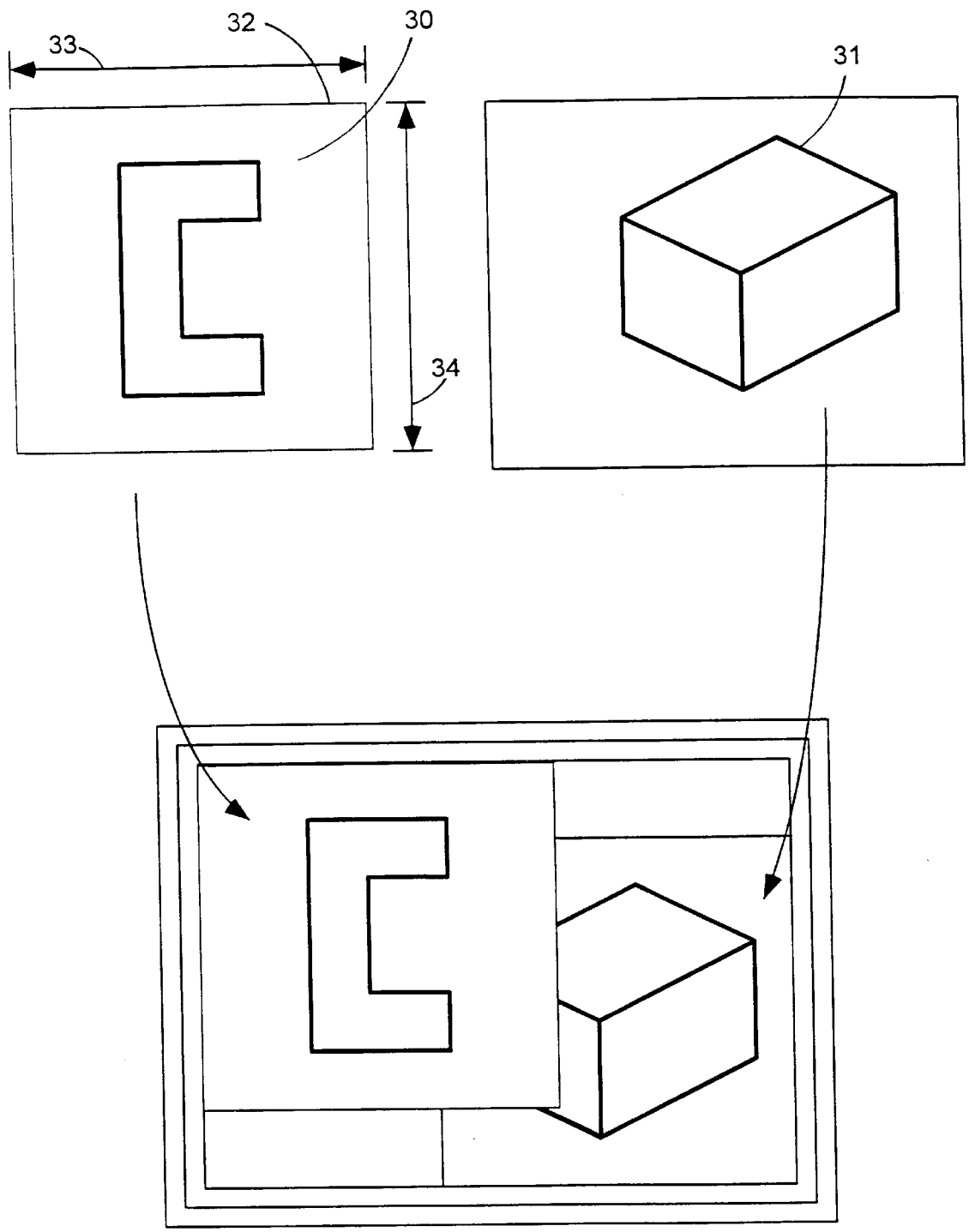
FIG. 4 illustrates a front view of a first three-dimensional object created by a first software application and an isometric view of a second three-dimensional object created by a second software application.

The third IOle3DObject function specifically provides a two-dimensional container the ability to specify a view of the three-dimensional object. As is illustrated in FIG. 3, three-dimensional container must be view and displayed from a viewing plane. The present function allows a two-dimensional container to define that viewing plane.

Figure 16:
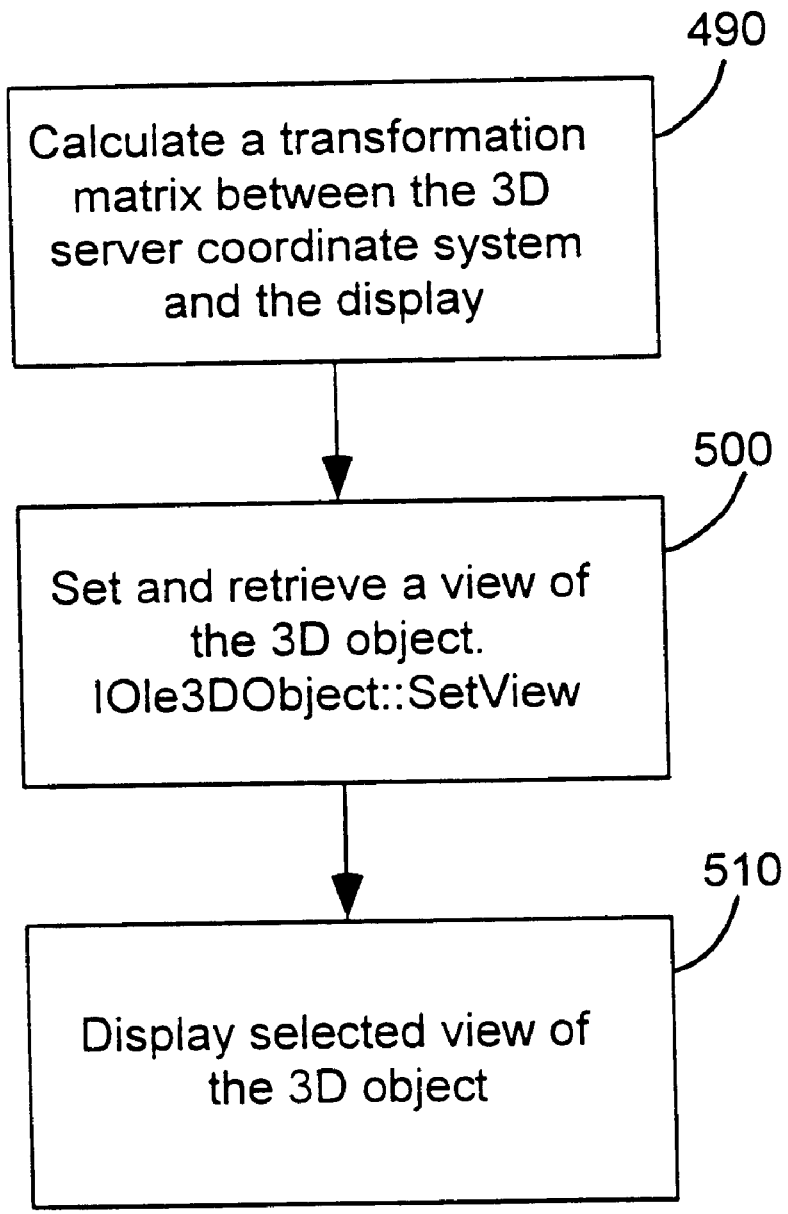
FIG. 16 illustrates a flow diagram of one embodiment of the process of calling SetView to allow a two-dimensional container to set and display a view of a three-dimensional object.

FIG. 16 illustrates a flow diagram of one embodiment of the process of calling SetView to allow a two-dimensional container to set and display a view of a three-dimensional object.

In FIG. 16, for a server to determine the display position of the default view on a display, a transformation matrix (as described above) between the server's coordinate system and the display's coordinate is first calculated is first calculated (step 490).

Once the transformation matrix is calculated, the container calls IOle3DObject::SetView (step 500) and passes the transformation matrix to the server. Based upon the transformation matrix, the server displays a view of the object to the display (step 510). The actual process of a server displaying the object will be discussed later in this disclosure.

Figure 17:
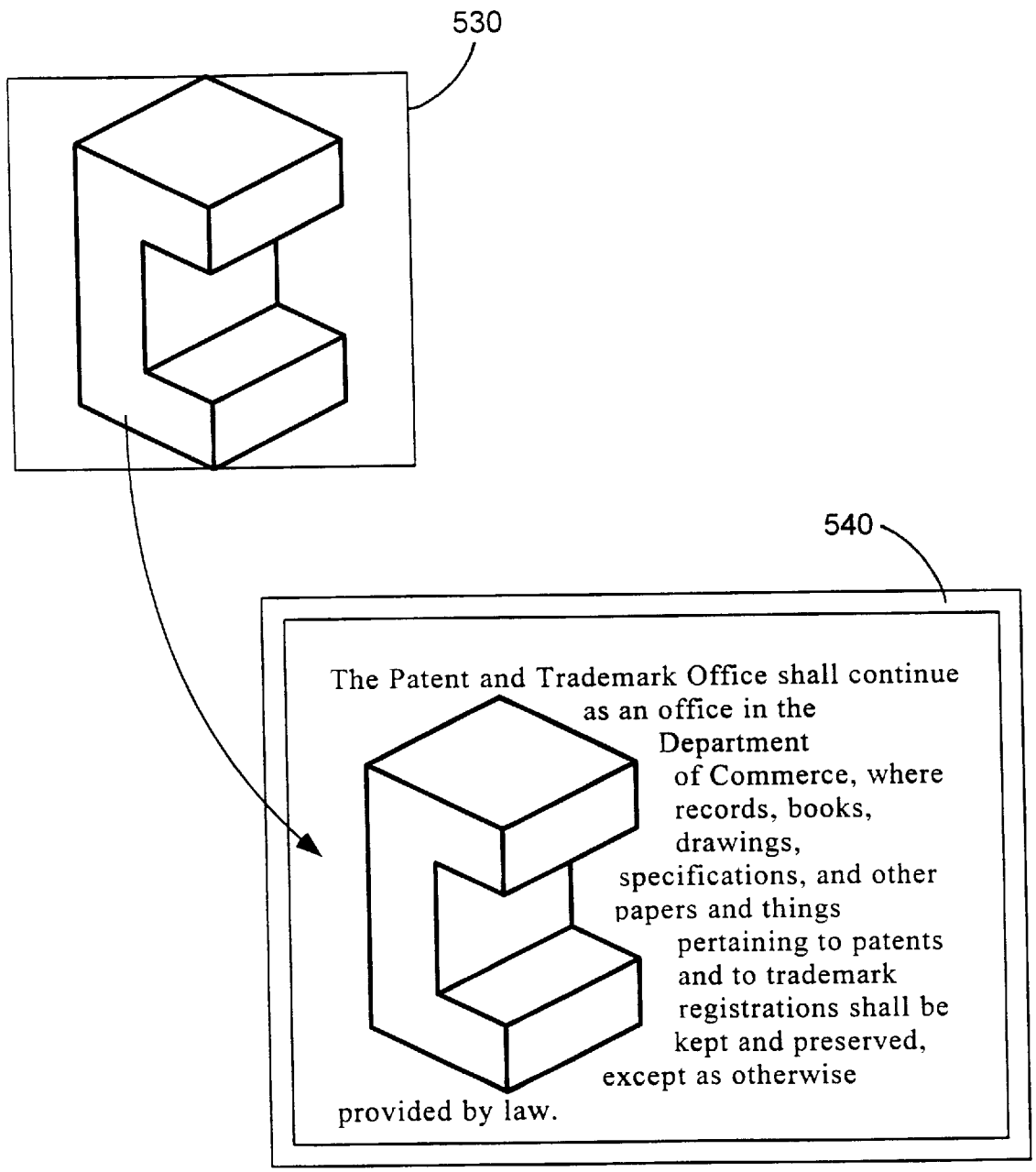
FIG. 17 illustrates a view of a three-dimensional object that is inserted in a two-dimensional container.

The result of a two-dimensional container defining a view of a three-dimensional object is illustrated in FIG. 17. In FIG. 17 a view 530 of a three-dimensional object is inserted in a two-dimensional container. After the container retrieves the three-dimensional object and passes the transformation matrix to the server, the server calculates and displays view 530 to the display. Because the container is also aware of the transformation matrix and positioning of the object, as illustrated, the container can then manipulate its data 540 to interact with view 530.

The following is a description of the preferred embodiment of the formal SetView interface:

| | | |
|---|---|---|
| IOle3DObject::SetView | | |
| HRESULT IOle3DObject ::SetView | (LPXFORMthree-dimensional pVToW, LPXFORMthree-dimensional pWToV, WORD wPlaneCnt, LPCLIPPLANES pClip) | |

Allows the container to specify the view with which a server displays.

| Argument | Type | Description |
|---|---|---|
| pVToW | LPXFORM3D | Matrix representing the View to Server World (pixel to three-dimensional (real world) coordinate system) Transformation Matrix. This matrix is a 4x4 matrix as described in OpenGL view matrices. It includes Rotation, Translation, Scale, Perspective and shearing information. |
| pWtoV | LPXFORM3D | Matrix representing the Server World to View Transformation Matrix. This matrix is a 4x4 matrix as described in OpenGL view matrices. It includes Rotation, Translation, Scale, Perspective and shearing information. This is the inverse of the pVtoW argument without perspective or projections. |
| wPlaneCnt | WORD | Number of clipping planes used to display. This number can vary between 0 and 6. When the number is 0, the pointer to the clipping planes equations can be null. |
| pClip | LPCLIPPLANES | Equations of the clipping planes expressed into the object coordinate system. Each clipping plane is represented by the 4 coefficients of the plane equation. There is a maximum of 6 clipping planes; this is an array of 24 doubles. The definition of the clipping planes is the same as in OpenGL. |
| return value | S_OK | The operation is successful. |
| E_INVALIDARG | | One of the arguments is invalid. |
| E_OUTOFMEMORY | | Out of memory. |
| E_UNEXPECTED | | An unexpected error happened. |

1.2. IViewGLObject

The IViewGLObject interface is an extension of the existing OLE IViewObject and allows a three-dimensional server to render a view of the object using IGL interface routines. IViewGLObject functions are used in the same programming context as the IViewObject functions, with added functionality described below. The IGL interface, OpenGL COM, includes standardized three-dimensional graphics rendering functions.

Figure 18:
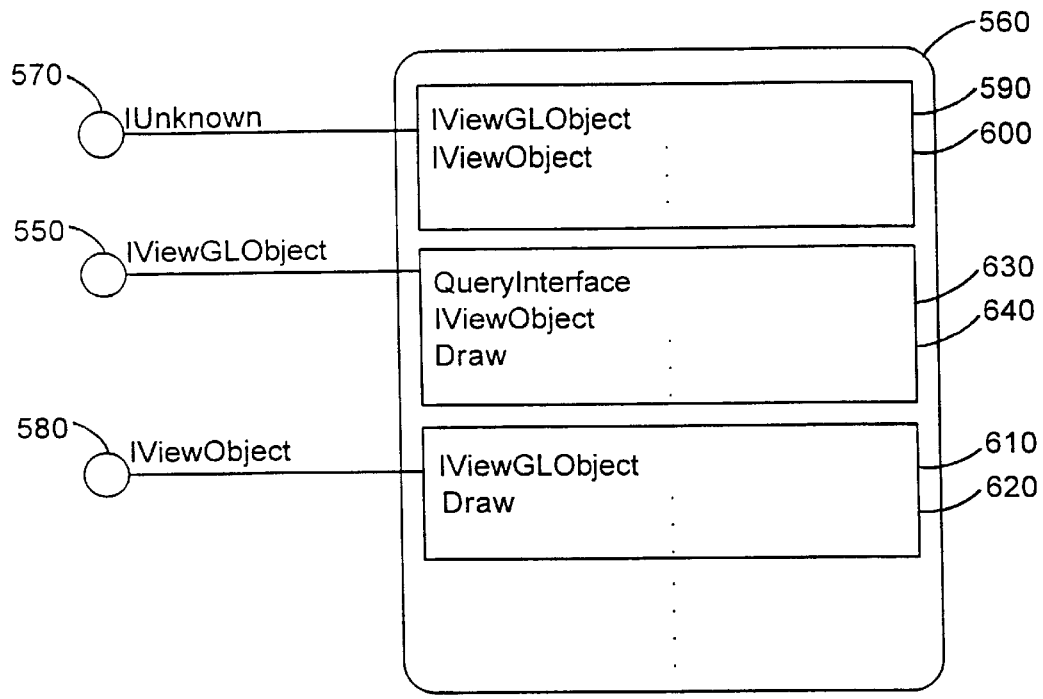
FIG. 18 illustrates the IViewGLObject interface for a user interface of an object.

FIG. 18 illustrates the IViewGLObject interface 550 for a user interface 560 of an object. User interface 560 includes an IUnknown interface 570 that is available in all OLE objects, and an IViewObject interface 580 that is also available in all OLE objects. IUnknown interface 570 includes a function 590 that when called returns a pointer to IViewGLObject interface 550 if the three-dimensional object can support OpenGL COM rendering interfaces and a function 600 that when called returns a pointer to IViewObject interface 580. IViewObject interface 580 includes a function 610 that when called returns a pointer to IViewGLObject interface 550 if the three-dimensional object can support OpenGL COM rendering and also includes a standard OLE Draw function 620. IView3DObject interface 550 includes a function 630 that when called returns a pointer to IViewObject interface 580, and includes a Draw function 640 as will be described below.

Figure 19:
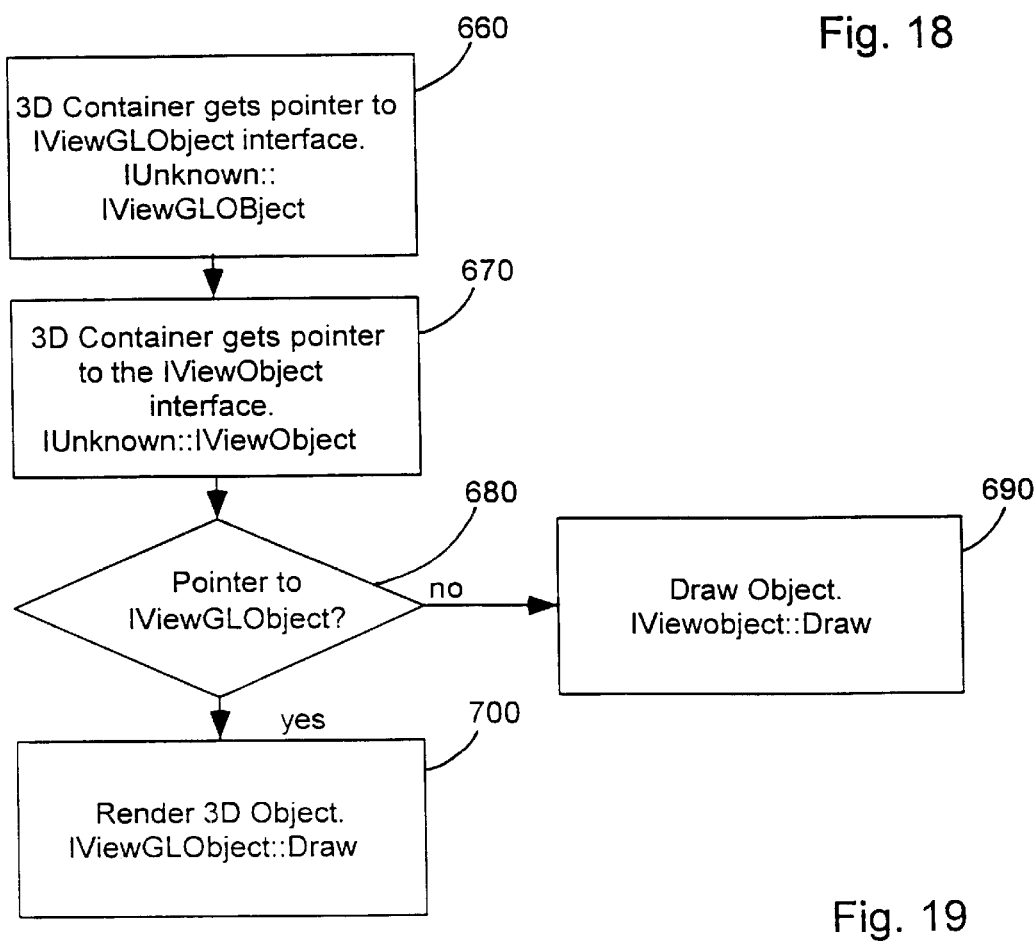
FIG. 19 is a flow diagram of one embodiment of the process of determining whether the object supports OpenGL COM.

FIG. 19 is a flow diagram of one embodiment of the process of determining whether the object supports OpenGL COM.

During initialization of an object, (e.g., creating or loading an object) the container queries IUnknown function 590 for a pointer to IViewGLObject interface 550 (step 660). At the same time, the container queries IUnknown function 600 for a pointer to IViewObject interface 550 in case the object does not support OpenGL COM (step 670).

In a preferred embodiment, the container further queries IViewObject function 590 for a pointer to IView3DObject interface 550. Once IView3DObject interface 550 is located, the container queries IView3DObject function 620 and ensures there is a pointer to IOleObject interface 580.

If the query of IViewObject function 610 or IUnknown function 590 return a NULL pointer (step 680), the server does not support the OpenGL COM rendering and the object is displayed in the conventional manner provided by OLE (step 690). If the above queries return a pointer to IView3DObject interface 550 the server supports OpenGL COM (step 700).

The following is a description of the preferred embodiment of the formal IViewGLObject interface:

```
interface IViewGLObject : IUnknown {
  // * IUnknown methods * //
  HRESULT QueryInterface (REFIID riid, LPVOID FAR* ppvObj);
  ULONGAddRef ();
  ULONGRelease ();
  // * IViewGLObject methods * //
  HRESULT Draw   (DWORD dwRep, LPIGL pIGL, LPXFORMthree-
                  dimensional pVToW, LPXFORMthree-dimensional
                  pWToV, WORD wPlaneCnt, LPCLIPPLANES
                  pClip);
};
```

1.2.1. IViewGLObject::Draw

Figure 20:
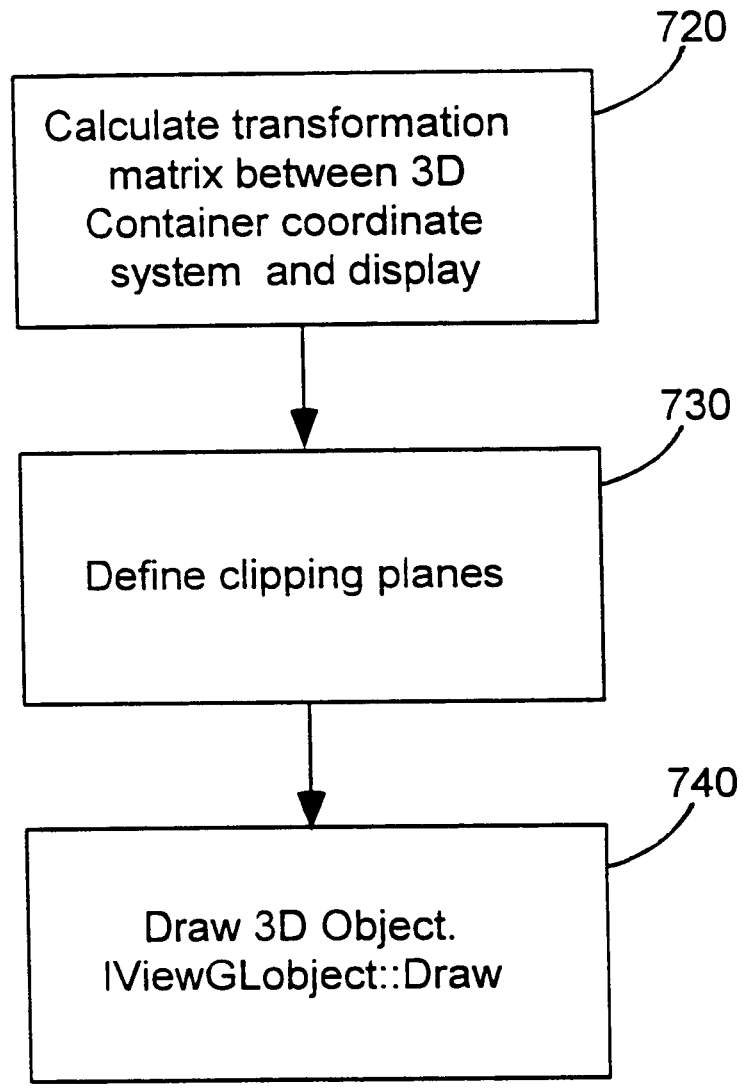
FIG. 20 is a flow diagram of one embodiment of the process of having a server displaying the object by calling OpenGL COM functions.

The use of the IViewGLObject::Draw function is relative straightforward. FIG. 20 is a flow diagram of one embodiment of the process of having a server displaying the object by calling OpenGL COM functions.

In FIG. 20, the transformation matrix between the container's coordinate system and the display (World to View) is calculated (step 720). Next, clipping plane equations that specify which portions of the object are rendered, are defined (step 730). Based upon the transformation matrix and the clipping plane equations, the server then calls IViewGLObject::Draw to render the object (step 740)

The following is a description of the preferred embodiment of the formal Draw interface:

IViewGLObject::Draw
HRESULT IViewGLObject::Draw (DVREP dwRep, LPIGL pIGL, LPXFORMthree-
dimensional pVToW, LPXFORMthree-dimensional
pWToV, WORD wPlaneCnt, LPCLIPPLANES * pClip)

Displays a server within a display context.

| Argument | Type | Description |
| --- | --- | --- |
| dwRep | DVREP | Type of representation requested. It is an extension of the two-dimensional aspect of IOleObject::GetExtent. This argument is a DVREP type. |
| pIGL | LPIGL | Pointer to the IGL interface. To display, the server simply calls IGL functions on the IGL interface pointer. |
| pVToW | LPXFORM3D | Matrix representing the View to World (pixel to three-dimensional (real worlds) coordinate system) Transformation Matrix of the OuterMost In-Place container. This matrix is a 4x4 matrix as described in OpenGL view matrices. It includes Rotation, Translation, Scale, Perspective and shearing information. |
| pWtoV | LPXFORM3D | Matrix representing the World to View Transformation Matrix of the OuterMost In-Place container. This matrix is a 4x4 matrix as described in OpenGL view matrices. It includes Rotation, Translation, Scale, Perspective and shearing information. If there is no perspective or projections, this is the inverse of the pVtoW argument. |
| wPlaneCnt | WORD | Number of clipping planes used to display. This number can vary between 0 and 6. When the number is 0, the pointer to the clipping planes equations can be null. |
| pClip | LPCLIPPLANES | Equations of the clipping planes expressed into the Object coordinate system. Each clipping plane is represented by the 4 coefficients of the plane equation. There is a maximum of 6 clipping planes; this is an array of 24 doubles. The definition of the clipping planes is the same as in openGL. |
| return value | S_OK | operation is successful. |
| E_INVALIDARG | | One of the arguments is invalid. |
| E_UNEXPECTED | | An unexpected error happened |

Note, the View to World and inverse: World to View matrices are both calculated. The World to View matrix is important to the server for view independent displays, for example, when text within an object should not display sheared, rotated or skewed.

1.3. IOleInPlace3DObject

The IOleInPlace3DObject interface is used by three-dimensional container applications to negotiate the three-dimensional display context, especially during In Place activation of the server.

Figure 21:
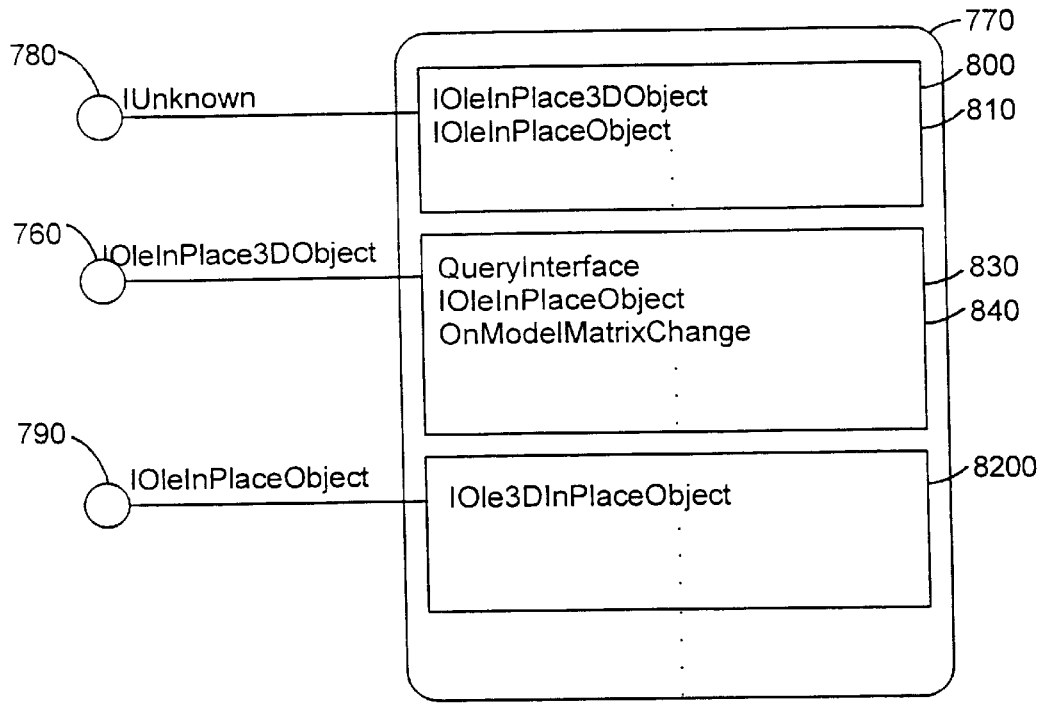
FIG. 21 illustrates the IOleInPlace3DObject interface for a user interface of an object.

FIG. 21 illustrates the IOleInPlace3DObject interface 760 for a user interface 770 of an object. User interface 770 includes an IUnknown interface 780 that is available in all OLE objects, and an IOleInPlaceObject interface 790 that is also available in all OLE objects which can In Place activate. IUnknown interface 780 includes a function 800 that when called returns a pointer to IOleInPlace3DObject interface 760 and a function 810 that when called returns a pointer to IOleInPlaceObject interface 790. IOleInPlaceObject interface 790 includes a function 820 that when called returns a pointer to IOleInPlace3DObject interface 760. IOleInPlace3DObject interface 760 includes a function 830 that when called returns a pointer to IOleInPlaceObject interface 790 and also includes a OnModelMatrixChange function 840 as will be described below.

Figure 22:
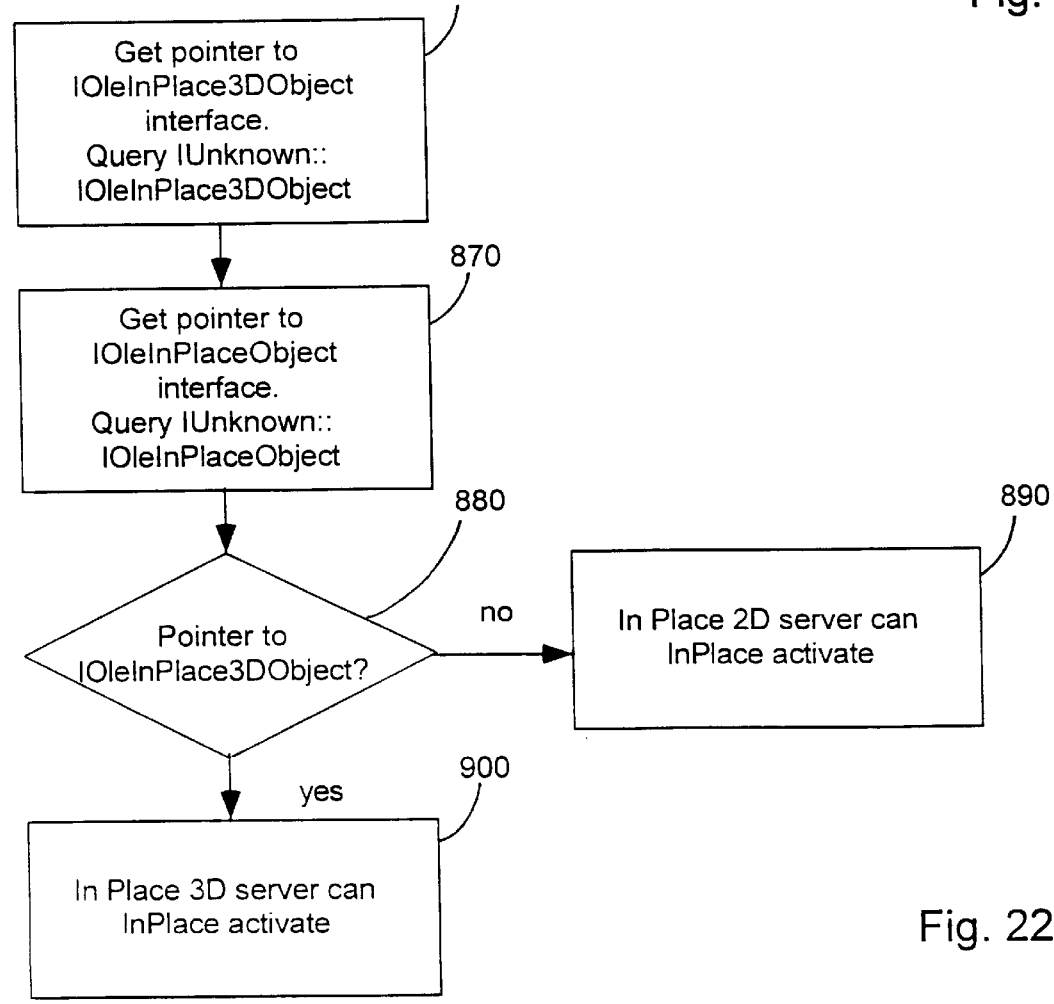
FIG. 22 is a flow diagram of one embodiment of the process of determining whether the three-dimensional object supports In Place activation.

FIG. 22 is a flow diagram of one embodiment of the process of determining whether the three-dimensional object supports In Place activation.

During initialization of an object, (e.g., creating or loading an object) the container queries IUnknown function 800 for a pointer to IOleInPlace3DObject interface 760 (step 860). At the same time, the container queries IUnknown function 810 for a pointer to IOleInPlaceObject interface 790 in case the object is not a three-dimensional object (step 870).

In a preferred embodiment the container further queries IOleInPlaceObject function 820 for a pointer to IOleInPlace3DObject interface 760.

If the query of IOleInPlaceObject function 820 or IUnknown function 810 return a NULL pointer (step 880), the object is not a three-dimensional object and the object is In Place activated using conventional OLE functions (step 890). If the above queries return a pointer to IOleInPlace3DObject interface 760 the three-dimensional object can be In Place activated (step 900).

The following is a description of the preferred embodiment of the formal IOleInPlace3DObject interface:

```
interface IOleInPlace3DObject : IUnknown {
    // * IUnknown methods * //
    HRESULT QueryInterface (REFIID riid, LPVOID FAR* ppvObj);
    ULONGAddRef ();
    ULONGRelease ();
    // * IOleInPlace3DObject methods * //
    HRESULT OnModelMatrixChange (LPXFORMthree-dimensional
                                                      pMatrix);
};
```

1.3.1 IOleInplace3DObject::OnModelMatrixChange

The OnModelMatrix function provides the In Place active server with a new attachment matrix when the container modifies its coordinate system.

Figure 23:
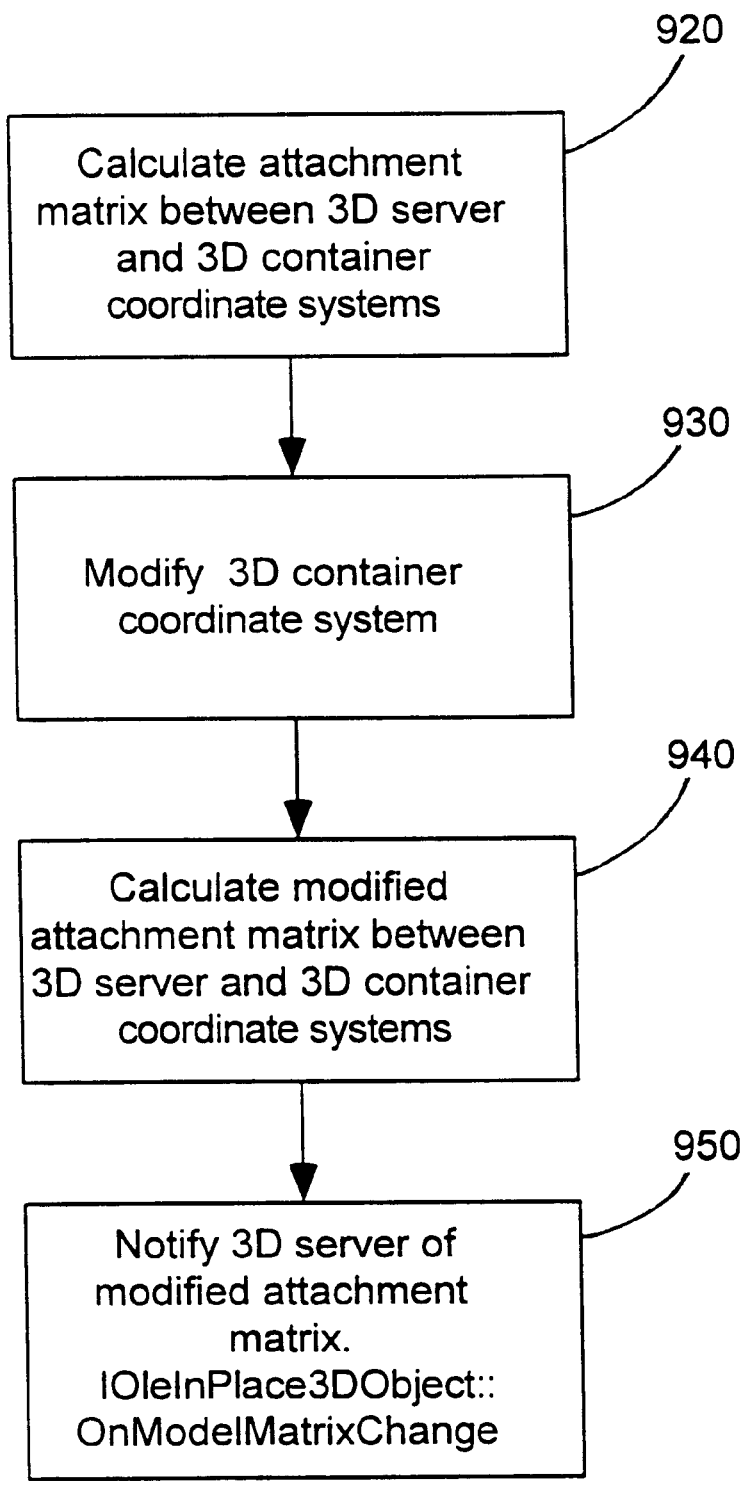
FIG. 23 illustrates that the attachment matrix between the server's coordinate system and the container's coordinate system is initially calculated.

FIG. 23 is a flow diagram of one embodiment of the process of using the IOleInPlace3DObject::OnModelMatrixChange function. In FIG. 23, the attachment matrix between the server's coordinate system and the container's coordinate system are initially calculated (step 920). Then, when the container's coordinate system is modified (step 930), the container calculates a modified attachment matrix between the server's coordinate system and the modified container coordinate system (step 940). The container then calls OnModelMatrixChange to notify the In Place Server of the modified attachment matrix (step 950). With the modified attachment matrix, the In Place Server can then take the modified attachment matrix, for example, and call IViewGLObject::Draw to draw an updated view of the object.

The following is a description of the preferred embodiment of the formal OnModelMatrixChange interface:
IOleInPlace3DObject::OnModelMatrixChange
HRESULT IOleInPlace3DObject::OnModelMatrixChange
    (LPXFORMthree-dimensional pMatrix)
Notifies the in-place object that the outermost three-dimensional container changed its model transformation matrix.

| Argument | Type | Description |
| --- | --- | --- |
| pMatrix | In | Pointer to an array of 16 doubles representing the 4x4 transformation from the in-place server to the outermost three-dimensional container. This matrix is ordered in the same way as a model transformation in OpenGL. It should not include any component that would make it singular (for example, perspective or projection). The matrix is allocated and deallocated by the caller. |
| return value | S_OK | The notification is done successfully. |
| E_OUTOFMEMORY | | The matrix cannot be allocated. |
| E_INVALIDARG | | The argument is invalid. |
| E_UNEXPECTED | | An unexpected error happened |

In the case where containers are nested within other containers, the attachment matrix is built-up by concatenating all the attachment matrices from adjacent containers and servers. The resulting matrix is thus a mapping between the outermost three-dimensional container to the in-place server.

2. Interfaces Enabling Navigation of A Container Environment

The new OLE interface as described herein provides a transition for three-dimensional servers and containers that include large numbers of objects having complicated relationships. Particular features enabled by these OLE interfaces include objects having non-rectangular boundaries and having transparent regions. Another particular feature enabled by these OLE interfaces includes enabling a container to provide multiple views of an object, for example a top, right-side, and front view of an object, at the same time. These new OLE interfaces also allow objects to become simultaneously In Place active in the different views, for example the object can be edited in one view and the results carried over automatically to the other views of the object.

Figure 24:
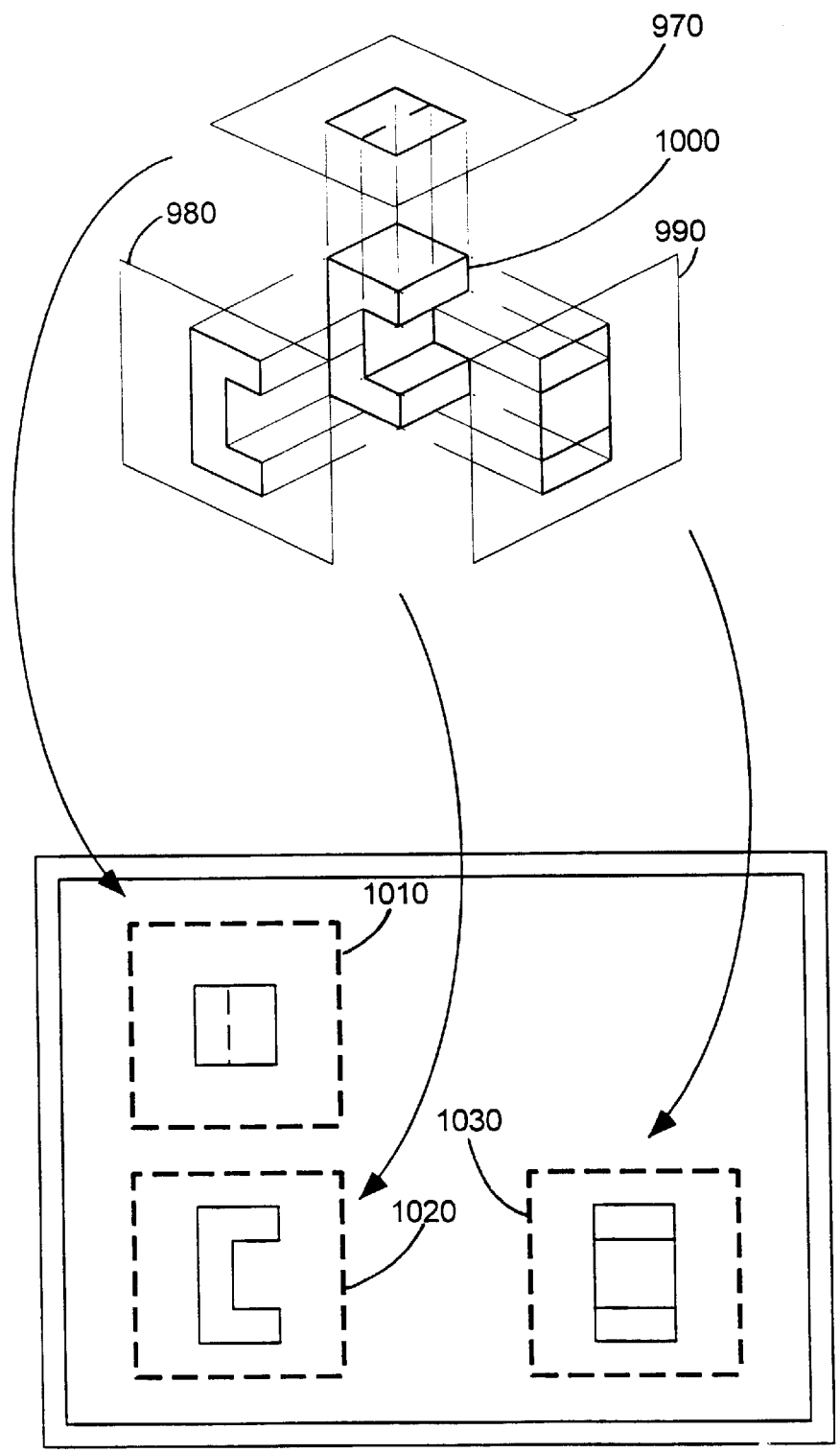
FIG. 24 illustrates a top view, a front view, and a right-side view of a three-dimensional object.

FIG. 24 illustrates a top view 970, a front view 980, and a right-side view 990 of a three-dimensional object 1000. When three-dimensional object 1000 is activated or retrieved, the server asks the container for positions in which the container supports In Place activation, for example positions 1010, 1020, and 1030. In response to the container's positions, the server creates a "child" view of the object corresponding to each of those positions. Each view is individually controlled in a manner similar to the standard OLE method of displaying a view of the object. In FIG. 24, the server displays top view 970 in position 1010, front view 980 in position 1020, and right-side view 990 in position 1030.

Because each view is simultaneously In Place active, each view allows the server to receive events such as mouse clicks. With standard OLE, when a mouse click, occurs outside the In Place active view, the view is deactivated and cannot receive input. With the OLE extensions, however, events occurring outside the In Place Active view is received by the server without the server being deactivated. The default way to deactivate a server is with an <esc>, although the server can provide a menu selection or may interpret a double-click on another object as a signal become inactivate.

The primary interface facilitating these functions is IOleInPlaceViews, to which the server obtains a pointer via IOleInPlace3DSite::GetWindowContext, as will be described below.

2.1. IOleInPlace3DSite

The IOleInPlace3DSite interface is an extension of the existing OLE IOleInPlaceSite interface and provides support for "In Place" activation of software applications creating three-dimensional objects. IOleInPlace3DSite functions are used in the same programming context as the IOleInPlaceSite functions, with added functionality described below. Specifically, the IOleInPlace3DSite interface allows servers to get the three-dimensional and view information from the container.

Figure 25:
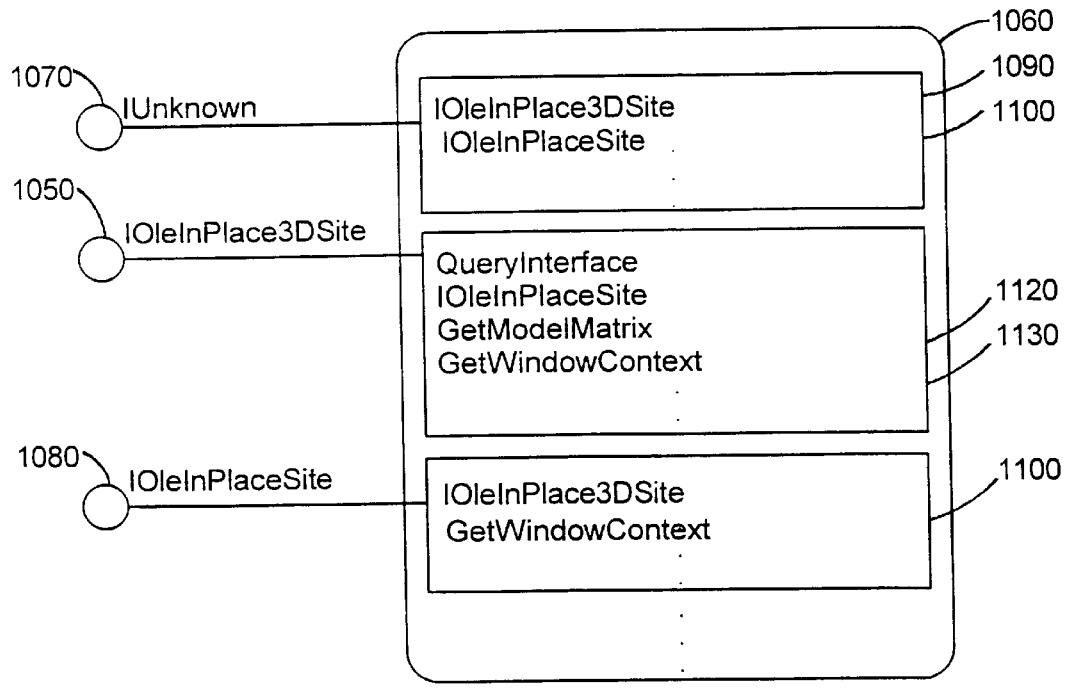
FIG. 25 illustrates the IOleInPlace3DSite interface for a user interface for a three-dimensional object.

FIG. 25 illustrates the IOleInPlace3DSite interface 1050 for a user interface 1060 for a three-dimensional object. User interface 1060 includes an IUnknown interface 1070 that is available in all OLE objects, and an IOleInPlaceSite interface 1080 that is also available in all OLE objects which can In Place activate. IUnknown interface 1070 includes a function 1090 that when called returns a pointer to IOleInPlace3DSite interface 1050 and a function 1100 that when called returns a pointer to IOleInPlaceSite interface 1080. IOleInPlaceSite interface 1080 includes a function 1110 that when called returns a pointer to IOleInPlace3DSite interface 1050. IOleInPlace3DSite interface 1050 includes a GetModelMatrix function 1120 and a GetWindowContext function 1130 as will be described below.

Figure 26:
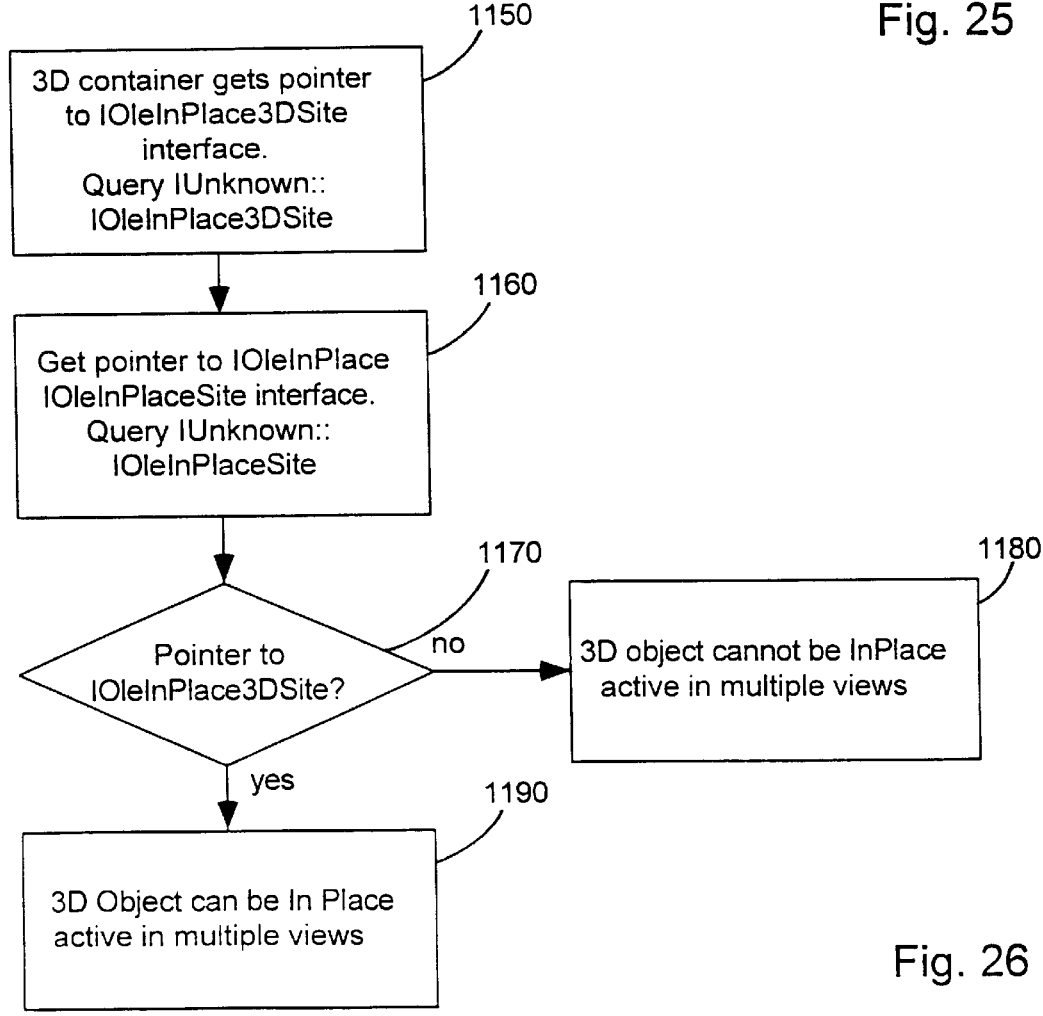
FIG. 26 is a flow diagram of one embodiment of the process of determining whether the three-dimensional object supports In Place activation.

FIG. 26 is a flow diagram of one embodiment of the process of determining whether the three-dimensional object supports In Place activation.

During initialization of an object, (e.g., creating or loading an object) the container queries IUnknown function 1070 for a pointer to IOleInPlace3DSite interface 1050 (step 1150). At the same time, the container queries IUnknown function 1100 for a pointer to IOleInPlaceSite interface 1080 (step 1160).

In a preferred embodiment, the container further queries IOleInPlaceSite function 1110 to ensure there is a pointer to IOleInPlace3DSite interface 1050.

If the query of IOleInPlaceSite function 1110 or IUnknown function 1090 return a NULL pointer (step 1170), the three-dimensional object can not be In Place activated in ing of object 1210 when the server is In Place active, an attachment matrix between the second container 1230 to the object 1210 is calculated, bypassing first container 1220.

Figure 28:
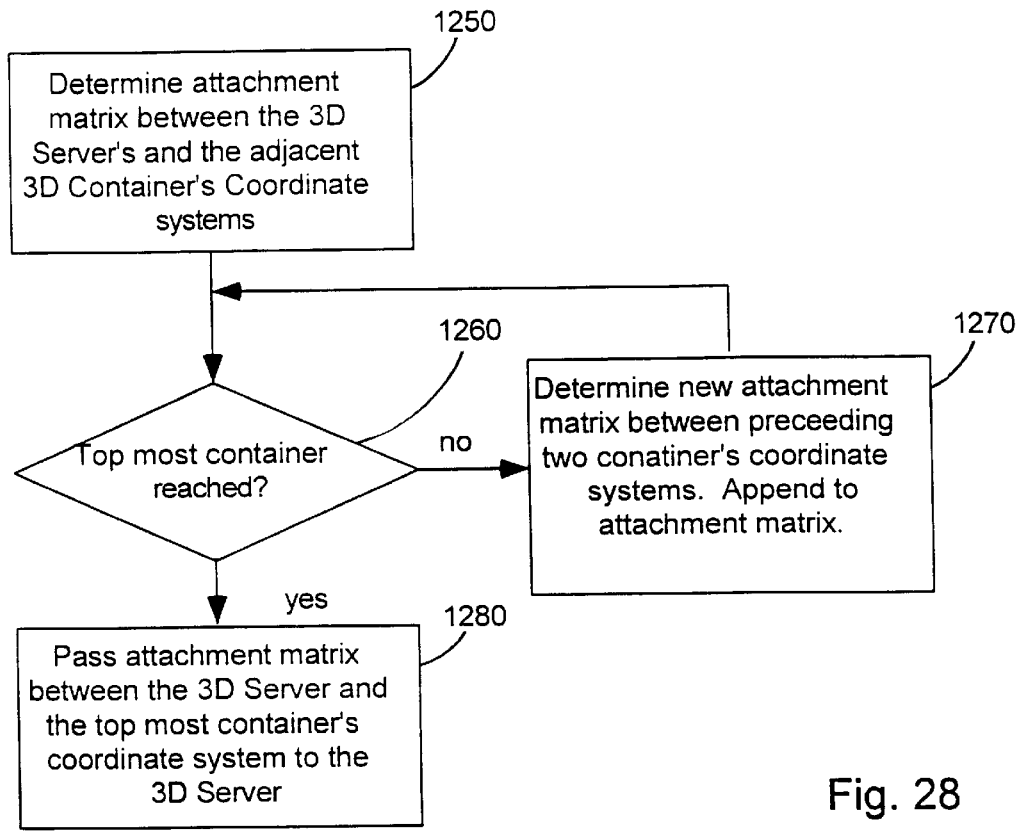
FIG. 28 illustrates the attachment matrix between the In Place active server's coordinate system and the immediately adjacent container's coordinate system is initially calculated.

FIG. 28 is a flow diagram of one embodiment of the IOleInPlace3DSite::GetModelMatrix function. In FIG. 28, the attachment matrix between the In Place active server's coordinate system and the immediately adjacent container's coordinate system is initially calculated (step 1250). The server then determines whether the immediately adjacent container was the top most container (step 1260). If, not the attachment matrix between the immediately adjacent container and the preceding container is calculated and appended to the attachment matrix (step 1270). Steps 1260 and 1270 are repeated until an attachment matrix between the top most container and the server is calculated. This attachment matrix is then passed to the server (step 1280).

The following is a description of the preferred embodiment of the formal GetModelMatrix interface:

IOleInPlace3DSite::GetModelMatrix
HRESULT IOleInPlace3DSite::GetModelMatrix
 (LPXFORMthree-dimensional pMatrix)
Gets the transformation matrix from the outermost three-dimensional container to the in-place server.

| Argument | Type | Description |
|---|---|---|
| pMatrix | LPXFORM3D | Pointer to an array of 16 doubles representing the 4x4 transformation from the in-place server to the outermost three-dimensional container. This matrix is ordered in the same way asa model transformation in OpenQL. The matrix is allocated and deallocated by the caller. |
| return value | S_OK | The matrix is returned successfully. |
| E_UNEXPECTED | | An unexpected error happened. | more than one view (step 1180). If the above queries return a pointer to IOleInPlace3DSite interface 1050 the three-dimensional object can be In Place activated in multiple views (step 1190).

The following is a description of the preferred embodiment of the formal IOleInPlace3DSite interface:

```
interface IOleInPlace3DSite : IUnknown {
    //* IUnknown methods * //
    HRESULT QueryInterface (REFIID riid, LPVOID FAR* ppvObj);
    ULONGAddRef ();
    ULONGRelease ();
    // * IOleInPlace3DSite methods * //
    HRESULT GetModelMatrix (LPXFORMthree-dimensional pMatrix);
    HRESULT GetWindowContext (LPOLEINPLACEVIEWS*
                                                    ppInPlaceViews);
```

2.1.1 OleInPlace3DSite::GetModelMatrix

Figure 27:
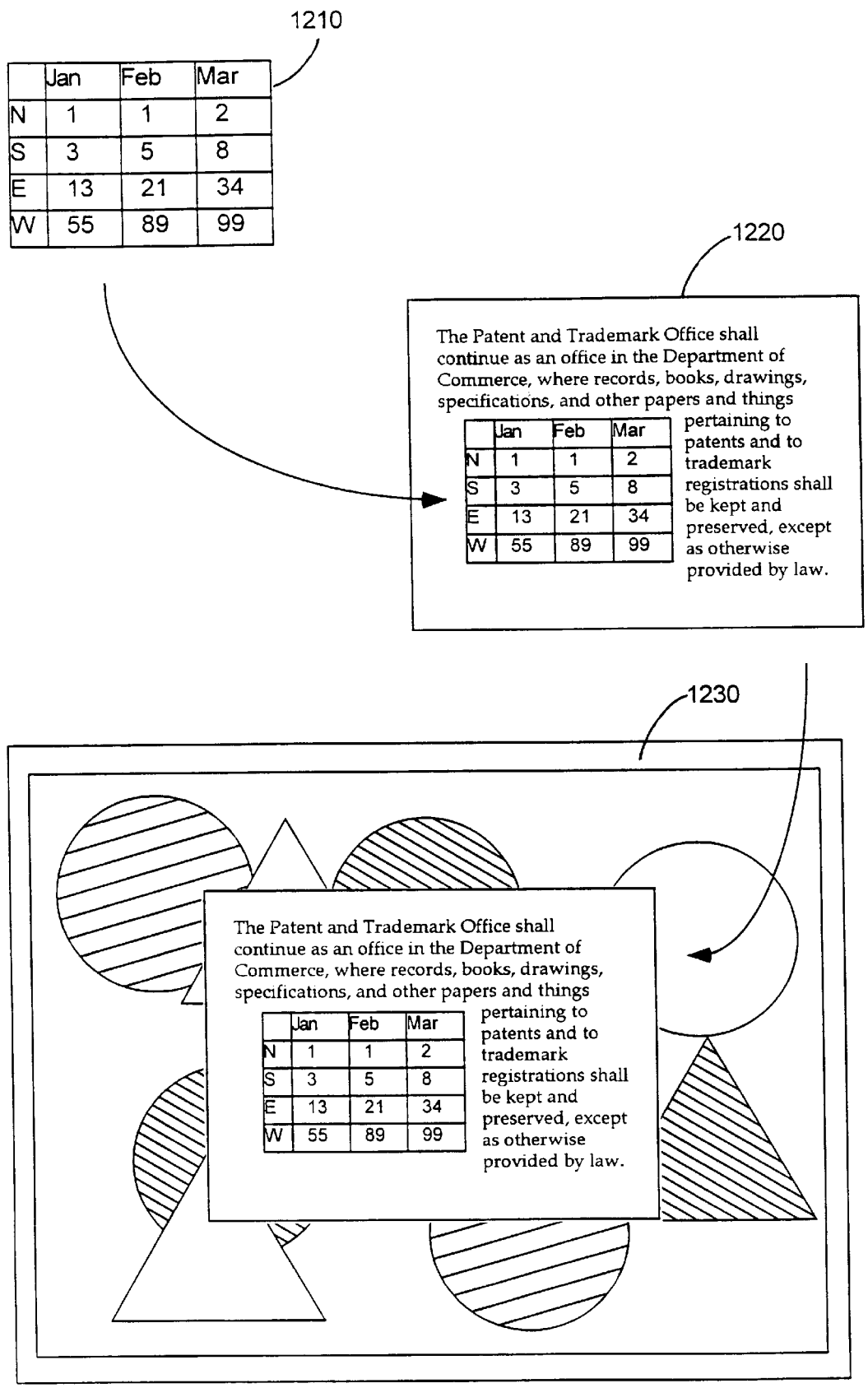
FIG. 27 illustrates an object is embedded into a first container and first container embedded into a second container.

The first OleInPlace3DSite function GetModelMatrix allows an embedded server to determine the attachment matrix between the server and the top-most container's coordinate system. FIG. 27 illustrates the general concept of embedding a server. In FIG. 27, an object 1210 is embedded into a first container 1220 and first container 1220 embedded into a second container 1230. In order to facilitate position- This function is called by the in-place server and recurses until it reaches the outermost three-dimensional container, concatenating the matrices.

2.1.2. OleInPlace3DSite::GetWindowContext

The second OleInPlace3DSite function GetWindowContext provides an interface between the outermost container and the In Place Server. As was illustrated in FIG. 27 object 1210 may be embedded into first container 1220 and first container 1220 embedded into second container 1230. Because the object can be embedded within several layers of containers, upon In Place activation of the server, the server and the top most container need to communicate with each other in order to pass system events. This interface is partially accomplished by passing a pointer to the IOleInPlaceViews interface of the outermost container to the object. The pointer to IOleInPlaceViews derives from the function GetWindowContext. IOleInPlaceViews interface will be described below.

The following is description of the preferred embodiment of the formal GetWindowContext interface:

IOleInPlace3DSite::GetWindowContext
HRESULT IOleInPlace3DSite::GetWindowContext
 (LPOLEINPLACEVIEWS* ppInPlaceViews)
Returns the outermost three-dimensional container window context.

| Argument | Type | Description |
| --- | --- | --- |
| ppInPlaceViews | LPOLEINPLACEVIEWS* | Pointer to the IOleInPlaceViews interface of the outermost three-dimensional container.. |
| return value | S_OK | The context is returned successfully. |
| E_INVALIDARG | | One of the arguments is invalid |
| E_UNEXPECTED | | An unexpected error happened. |

This function recurses until it reaches the outermost three-dimensional container and returns its IOleInPlaceViews interface to the in-place server. This function establishes the handshaking between the outermost three-dimensional container and the three-dimensional in-place server.

```
interface IOleInPlaceViews : IUnknown {
    // * IUnknown methods * //
    HRESULT QueryInterface      (REFIID riid, LPVOID FAR* ppvObj);
    ULONGAddRef ();
    ULONGRelease ();
    // * IOleInPlaceViews methods * //
    HRESULT EnumInPlaceViews    (LPENUMHNND* ppenumHwnd);
    HRESULT GetViewContext      (HWND hwnd, LPIGL* pIGL, LPXFORMthree-
                                dimensional pVToW, LPXFORMthree-dimensional
                                PWToV);
    HRESULT SetActive3DObjec    (LPOLEINPLACEACTIVE3DOBJECT
                                p3DActiveObj);
```

2.2. IOleInPlaceViews

The IOleInPlaceViews interface is derived from the IOleInPlace3DSite::GetWindowContext function (described above) and provides support for "In Place" activation of software applications that create three-dimensional objects. IOleInPlaceViews functions are used in the same programming context as the IOleInPlaceUIWindow functions, with added functionality described below. More specifically, IOleInPlaceViews allows servers to obtain view information from the three-dimensional containers, such as the location and size of views 1010, 1020, and 1030, in FIG. 24.

Figure 29:
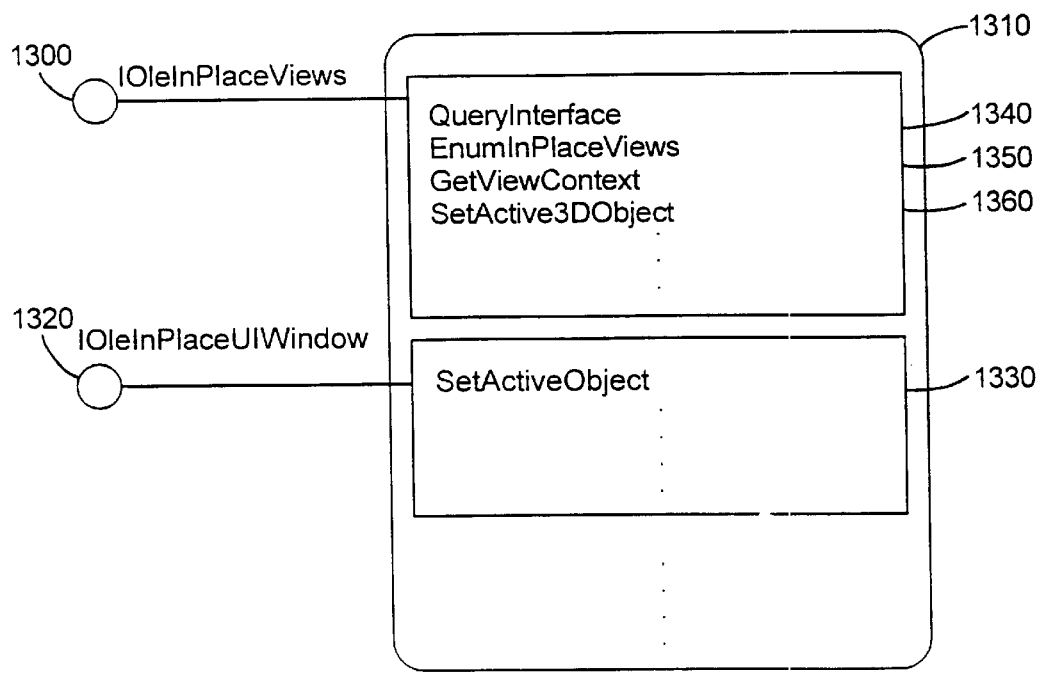
FIG. 29 illustrates the IOleInPlaceViews interface for a user interface for a three-dimensional object.

FIG. 29 illustrates the IOleInPlaceViews interface 1300 for a user interface 1310 for a three-dimensional object. User interface 1310 also includes a IOleInPlaceUIWindow interface 1320 that allows In Place active objects to negotiate border space, IOleInPlaceUIWindow includes function 1330. IOleInPlaceViews interface 1300 includes a EnumInPlaceViews function 1340, a GetViewContext function 1350, and a SetActive3DObject function 1360 as will be described below.

The following is a description of the preferred embodiment of the formal IOleInPlaceViews interface:

2.2.1. IOleInPlaceViews::EnumInPlaceViews

The first IOleInPlaceViews function EnumInPlaceViews allows the server to receive a list of the container's view in which the server is In Place Activated. For example, in FIG. 24, views 1010, 1020, and 1030 would be enumerated as supporting In Place activation of the server.

The following is a description of the preferred embodiment of the formal EnumInPlaceViews interface:
IOleInPlaceViews::EnumInPlaceViews
HRESULT IOleInPlaceViews::EnumInPlaceViews
 (LPENUMHWND* ppenumHwnd)
Returns the list of in-place active windows into the container.

| Argument | Type | Description |
| --- | --- | --- |
| ppenumHwnd | LPENUMHWND* | Enumerator of the views used for in-place activation. |
| return value | S_OK | The Display context information is passed successfully. |
| E_OUTOFMEMORY | | The enumerator cannot be allocated. |
| E_INVALIDARG | | One of the arguments is invalid |
| E_UNEXPECTED | | An unexpected error happened. |

This function, implemented by three-dimensional graphic containers, is called by In-Place three-dimensional servers to know the list of views concerned by in-place activation. Once the object has this list, it can ask for their context by calling IOleInPlaceViews::GetViewContext.

2.2.2. IOleInPlaceViews::GetViewContext

The second IOleInPlaceViews function GetViewContext allows the server to obtain a transformation matrix between the top most container coordinate system and the display (i.e., world to view matrix). With this transformation matrix for each of the In Place active views, the server knows the proper display context on the display, knows how to properly process events such as mouse clicks on the display, and knows how to perform dynamic (rubberbanding) displays on that view. To avoid marshalling (defined in "Inside OLE 2" described above), a server could display itself by using the attachment matrix and World to View matrix to determine the context for the server view.

The following is a description of the preferred embodiment of the formal GetViewContext interface:
IOleInPlaceViews::GetViewContext
HRESULT IOleInPlaceViews::GetViewContext (HWND hwnd, LPIGL* pIGL, LPXFORMthree-dimensional pVToW, LPXFORMthree-dimensional pWToV)
Returns the Graphic context of the three-dimensional In-Place Window.

2.2.3. IOleInPlaceViews::SetActive3DObject

The third IOleInPlaceViews function SetActive3DObject allows the server to give the container a pointer to its IOleInPlaceActive3DObject interface, so that the container can modify the views, as will be described below.

The following is a description of the preferred embodiment of the formal SetActive3DObject interface:

IOleInPlaceViews::SetActive3DObject
HRESULT IOleInPlaceViews::SetActive3DObject (LPOLEINPLACEACTIVE3DOBJECT p3DActiveObj)

Sets the IOleInPlaceActive3DObject connection.

| Argument | Type | Description |
| --- | --- | --- |
| hwnd | HWND | Handle to the window to get the context from. |
| pIGL | LPIGL* | Pointer to the IGL interface (Interface Graphic Library), the server is responsible to add a reference to this interface, and release it when it decativates. |
| pVToW | LPXFOMR3D | Matrix representing the View to World (pixel to three-dimensional (real worlds) coordinate system) Transformation Matrix of the OuterMost In-Place container. This matrix is a 4x4 matrix as described in OpenGL view matrices. It includes Rotation, Translation, Scale, Perspective and shearing information. |
| pWtoV | LPXFORM3D | Matrix representing the World to View Transformation Matrix of the OuterMost In-Place container. This matrix is a 4x4 matrix as described in OpenGL view matrices. It includes Rotation, Translation, Scale, Perspective and shearing information. This is the inverse of the pVtoW argument without perspective or projections. |
| return value | S_OK | The Display context information is passed successfully. |
| E_OUTOFMEMORY | | The matrix cannot be allocated. |
| E_INVALIDARG | | One of the arguments is invalid |
| E_UNEXPECTED | | An unexpected error happened. |

| Argument | Type | Description |
| --- | --- | --- |
| p3DActiveObj | LPOLEINPLACEACTIVE3DOBJECT | Pointer to the IOleInActiveObject interface |
| return value | S_OK | The operation was successful. |
| E_INVALIDARG | | One of the arguments is invalid. |
| E_UNEXPECTED | | An unexpected error happened. |

This function, implemented by three-dimensional graphic containers, is called by In-Place three-dimensional servers to initialize their display context. The pointer to the IGL interface is different here. The server must push the container's model matrix (see IOleInPlace3DSite:GetModelMatrix) and the pWtoV matrix before displaying in dynamics. After displaying, the server should pop the context back. This allows the container (possibly upon an IAdviseSink::OnViewChange) to send the display to other objects without concern for this object's display context.

To establish a direct link between the In-Place server and the container, the Server calls IOleInPlace3DSite::GetWindowContext and stores it, then it calls IOleInPlaceViews::SetActive3DObject giving its interface to IOleInPlaceActive3DObject, so the Container can store its connection too.

Figure 35:
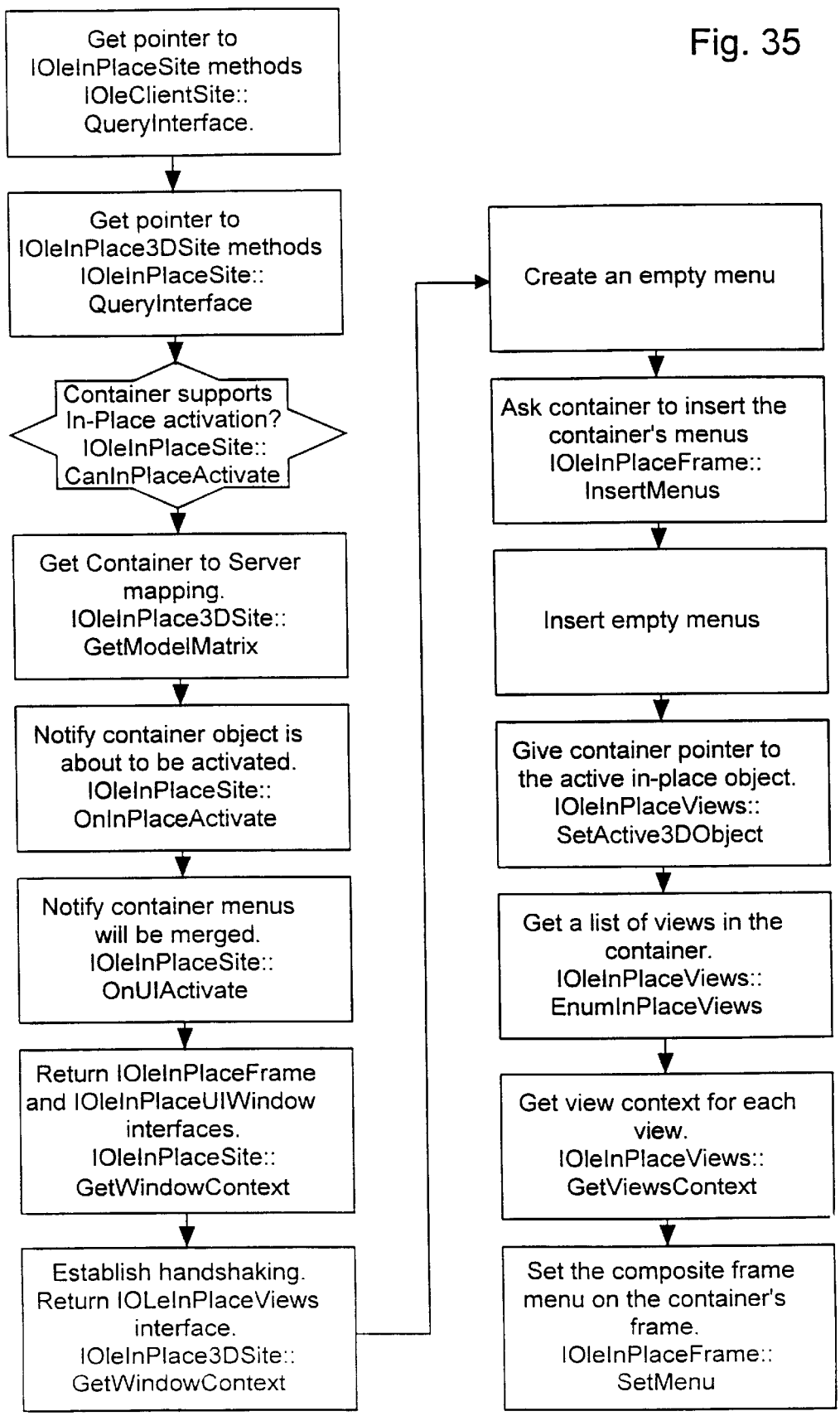
FIG. 35 is a flow diagram of one embodiment of the process of in-place activating.

A more detailed in-place activation flow diagram, as illustrated in FIG. 35, is summarized below for convenience, although not necessary for one familiar with standard OLE. (Note: functions not described in the specification section are fully described in "Inside OLE 2" as described above): receiving IOleObject::DoVerb (or IOle3DObject::DoVerb), the server calls the following:

| | |
|---|---|
| IOleClientSite::QueryInterface | for the IoleInPlaceSite interface, and stores it. |
| IOleInPlaceSite::QueryInterface | for the IOleInPlace3DSite interface, and stores it. |
| IOleInPlaceSite::CanInPlaceActivate, | asking if the container supports In-place activation. |
| IOleInPlace3DSite::GetModelMatrix | to get the ModelMatrix (outermost container to server). |
| This calls recurses until it reaches the outermost three-dimensional container. | |
| IOleInPlaceSite::OnInPlaceActivate | to notify the container that the object is about to be activated. |
| IOleInPlaceSite::OnUIActivatate | to notify the container that the menus are going to be merged. |
| IoleInPlaceSite::GetWindowContext | to return IOleInPlaceFrame and IOleInPlaceUIWindow interfaces. |
| IOleInPlace3DSite::GetWindowContext | to return the IOleInPlaceViews interface (windows manager). |
| CreateMenu to create an empty menu. | |
| IOleInPlaceFrame::InsertMenus to ask the container to insert its menus. | |
| InsertMenus to insert its own menus. | |
| IOleInPlaceUIWindow::SetActiveObject | to give the container a pointer to its IoleInplaceActiveObject. |
| IOleInPlaceViews::SetActive3DObject | to give the container a pointer to its IOleInPlaceActive3DObject. |
| IOleInPlaceViews::EnumInPlaceViews | to get the list of container views. |
| IOleInPlaceViews::GetViewsContext | to get view context for each view. |
| IOleInPlaceFrame::SetMenu | to set the composite frame menu on the container's frame. |

2.3. IOleInPlaceActive3DObject

The IOleInPlaceActive3DObject interface allows the container to inform the In Place active object of any view changes, deletions or creations. The IOleInPlaceActive3DObject interface is an extension of the IOleInPlaceActiveObjeect interface and is implemented by three-dimensional containers supporting In Place Activation. IOleInPlaceActive3DObject functions are used in the same programming context as the IOleInPlaceActiveObject functions, adding the functionality of notifying the server of multiple views, as described below. The IOleInPlaceActive3DObject interface derives from IOleInPlaceViews::SetActive3DObject as described above.

Figure 30:
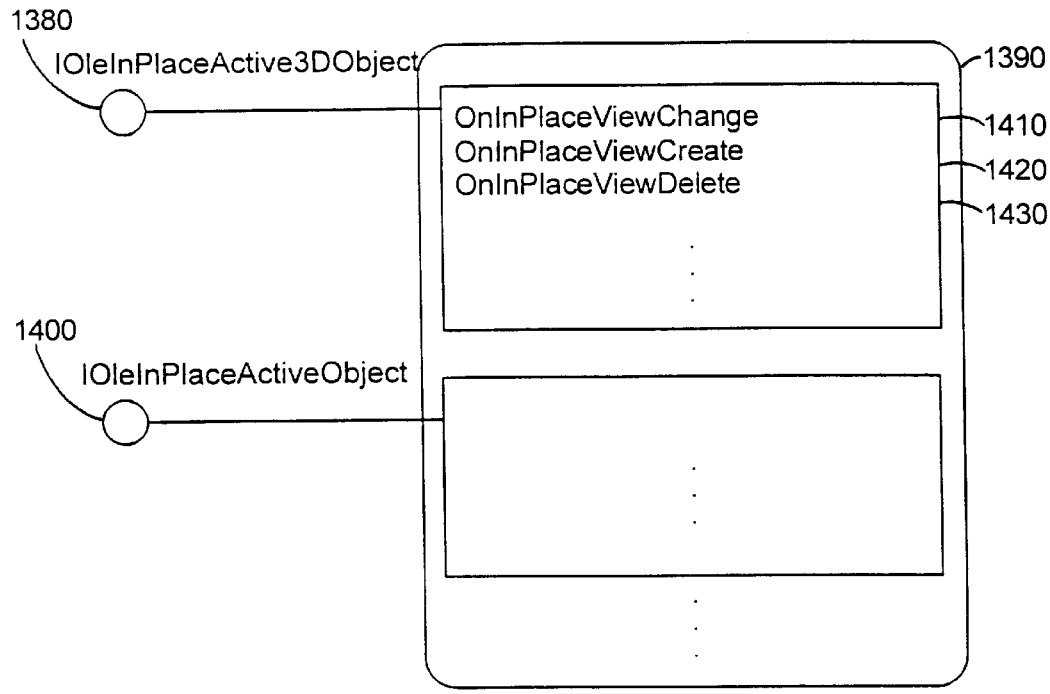
FIG. 30 illustrates a IOleInPlaceActive3DObject interface for a user interface.

FIG. 30 illustrates a IOleInPlaceActive3DObject interface 1380 for a user interface 1390. User interface 1390 includes IOleInPlaceActiveOBject interface 1400. IOleInPlaceActive3DObject interface 1380 includes a OnInPlaceViewChange function 1410, an OnInPlaceViewChange function 1420, and a OnInPlaceViewDelete function 1430 as will be described below.

The following is a description of the preferred embodiment of the formal IOleInPlaceActive3DObject interface:

2.3.1.

IOleInPlaceActive3DObject::OnInPlaceViewChange

The first IOleInPlaceActive3DObject function OnInPlaceViewChange is used when the outermost three-dimension container modifies one of its In Place views. An example is if the position of views 1020 and 1030 in FIG. 24 are switched. In response, the container calls OnInPlaceViewChange which notifies the In Place server of the change in the transformation matrices between the positioning of the views in the container and the server.

The following is a description of the preferred embodiment of the formal OnInPlaceViewChange interface:

IOleInPlaceActive3DObject::OnInPlaceViewChange
HRESULT
   IOleInPlaceActive3DObject::OnInPlaceViewChange
   (HWND hwnd, LPXFORMthree-dimensional pVtoW,
   LPXFORMthree-dimensional pWtoV)

```
interface IOleInPlaceActive3DObject :IUnknown {
// * IUnknown methods * //
HRESULT QueryInterface (REFIID riid, LPVOID FAR* ppvObj);
ULONGAddRef ();
ULONGRelease ();
// * IOleInPlaceActiveObject methods * //
// * IOleInPlaceActive3DObject methods * //
HRESULT OnInPlaceViewChange    (HWND hwnd, LPXFORMthree-dimensional
                                pVtoW, LPXFORMthree-dimensional
                                pWtoV);
HRESULT OnInPlaceViewCreate    (HWND hwnd);
HRESULT OnInPlaceViewDelete    (HWND hwnd);
}
```

| Argument | Type | Description |
|---|---|---|
| hwnd | HWND | Handle of the view modified. |
| pVtoW | LPXFORM3D | ViewToWorld three-dimensional Matrix transformation (this is a 4x4 Matrix following OpenGL standard, it carries rotation, translation, scaling, shearing, and perspective information. |
| pWtoV | LPXFORM3D | WorldToView three-dimensional Matrix transformation (this is a 4x4 Matrix following OpenGL standard, it carries rotation, translation, scaling, shearing, and perspective information. |
| return value | S_OK | The operation was successful |
| E_OUTOFMEMORY | | The matrix cannot be allocated. |
| E_INVALIDARG | | One of the arguments is invalid. |
| E_UNEXPECTED | | An unexpected error happened. |

The in-place server has to keep this information. One matrix (ViewToWorld)is used for locate purpose, the other one (WorldToView) for display in dynamics. These two matrices are passed because they might carry perspective or projection and can be singular, so one might not be deduced from the other one by inversion.

2.3.2.

IOleInPlaceActive3DObject::OnInPlaceViewCreate

The second IOleInPlaceActive3DObject function OnInPlaceViewCreate is used when the outermost three-dimensional container adds a new view of an object to the container. An example is if the container adds another view of object 1000 above position 1030, in FIG. 24. In response the container calls OnInPlaceViewChange, which notifies the In Place server of the new view.

The following is a description of the preferred embodiment of the formal OnInPlaceViewCreate interface:
IOleInPlaceActive3DObject::OnInPlaceViewCreate
HRESULT
  IOleInPlaceActive3DObject::OnInPlaceViewCreate
  (HWND hwnd)
Notifies the In-Place Object that the outermost three-dimensional container just created a new in-place active window.

| Argument | Type | Description |
|---|---|---|
| hwnd | HWND | Handle of the view created. |
| return value | S_OK | The notification is received successfully |
| E_INVALIDARG | | One of the arguments is invalid. |
| E_UNEXPECTED | | An unexpected error happened. |

The in-place server then calls IOleInPlaceViews::GetViewContext to get the new display context and stores it.

2.3.3.

IOleInPlaceActive3DObject::OnInPlaceViewDelete

The third IOleInPlaceActive3DObject function OnInPlaceViewDelete is used when the outermost three-dimension container deletes a view of an object to the container. For example, if view 1010 of object 1000 in FIG. 24 is deleted, the container calls OnInPlaceViewDelete and notifies the In Place server to stop displaying that view.

The following is a description of the preferred embodiment of the formal OnInPlaceViewDelete interface:
IOleInPlaceActive3DObject::OnInPlaceViewDelete
HRESULT
  IOleInPlaceActive3DObject::OnInPlaceViewDelete
  (HWND hwnd)
Notifies the In-Place Object that the outermost three-dimensional container just deleted a view participating in the in-place activation.

| Argument | Type | Description |
|---|---|---|
| hwnd | HWND | Handle of the view deleted. |
| return value | S_OK | The delete notification is received successfully |
| E_INVALIDARG | | One of the arguments is invalid. |
| E_UNEXPECTED | | An unexpected error happened. |

The in-place server then remove this view from its "active view list" and free the useless context.

3. Interfaces Enabling Three-Dimensional Object Interaction

The new OLE interfaces as described herein allow three-dimensional objects to interact with each other in the container coordinate system. When applications combine three-dimensional objects in complicated relationships within a container/document, to interact properly, objects must make use of spatial information of surfaces in other objects. This "interoperability" between objects extends to enabling one object to "find" the "elements" making up another object. What is done with that information is up to the user or server application. Interoperability further allows overlapping objects to utilize each other's position and geometry during complicated, precise-relationship manipulations. A common example involves the user wanting to manipulate some geometric element relative to the geometry of some other object (or element in the container).

Figure 31:
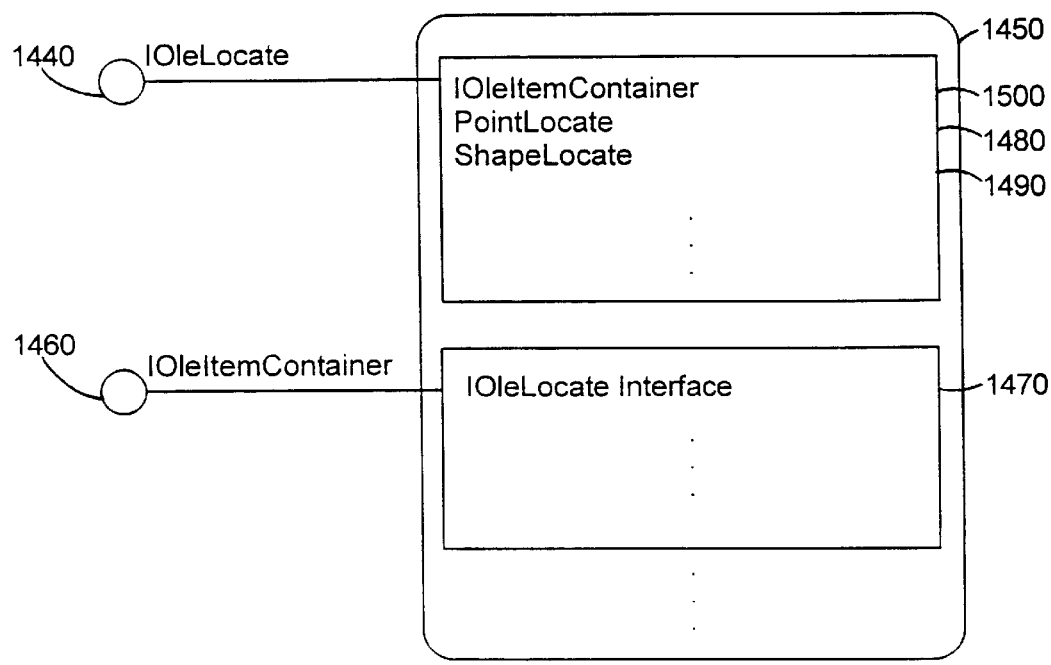
FIG. 31 illustrates the IOleLocate interface for a user interface of an object.

FIG. 31 illustrates the IOleLocate interface 1440 for a user interface 1450 of an object. User interface 1450 includes an IOleItemContainer interface 1460 that is also available to OLE objects. IOleItemContainer interface 1460 includes a function 1470 that when called returns a pointer to IOleLocate interface 1440 if the object can return spatial information. IOleLocate interface 1440 includes a PointLocate function 1480, a ShapeLocate function 1490, and an IOleItemContainer function 1500 as will be described below.

To use IOleLocate, the server must insure that function 1470 can return a pointer to the IOleLocate interface 1460. Similarly, IOleLocate function 1500 must also return a pointer to IOleItemContainer interface 1460 so that the container can take advantage of other IOleItemContainer functions such as EnumObjects and ParseDisplayName (not shown). If the server only supports location of the object itself and not "elements" of the object, then IOleLocate need not be concerned with IOleItemContainer.

The following is a description of the preferred embodiment of the formal IOleLocate interface and variable type definitions:

```
interface IOleLocate : IUnknown {
  // * IUnknown methods * //
  HRESULT QueryInterface       (REFIID riid, LPVOID FAR* ppvObj);
  ULONGAddRef ();
  ULONGRelease ();
  // * IOleLocate methods * //
  HRESULT PointLocate          (LPBORELINE pBoreLine, LPENUMMONIKER*
                                ppEnumMoniker);
  HRESULT ShapeLocate          (LPSHAPE pshape, LPENUMMONIKER*
                                ppEnumMoniker);
};
typedef struct tagBoreLine {
  double m_point[3];           // BoreLine definition
  double m_direction[3];       // Eye Point
                               // Direction vector
  double m_front;              // Front curvilinear abscissa >= 0.0
  double m_back;               // Back curvilinear abscissa <= 0.0
  double m_radius;             // Tolerance to locate > 0.0
} BORELINE;
typedef BORELINE FAR* LPBORELINE;
typedef enum tagSHAPETYPE {    // Possible types of shapes
  SHAPETYPE_INSIDE = 0,        // Select the elements inside the polygon
  SHAPETYPE_OUTSIDE = 1,       // select the elements outside the
                               //   polygon
  SHAPETYPE_OVERLAP = 2        // select elements overlapping either
                               //   INSIDE or OUTSIDE
} SHAPETYPE;
typedef struct tagShape {      // Shape definition
  double*  m_lpoint;           // List of points defining the polygon
  int      m_pointCount;       // Number of points in the list
  double   m_direction[3];     // Direction vector (of shape walls)
  double   m_front;            // Front curvilinear abscissa >= 0.0
  double   m_back;             // Back curvilinear abscissa <= 0.0
  SHAPETYPE m_type;            // type of shape described
} SHAPE;
typedef SHAPE FAR* LPSHAPE;
```

3.1 IOleLocate:PointLocate

The first IOleLocate function PointLocate enables a server to obtain a list of "elements" in another object that intersect a user defined boreline in space.

Figure 32:
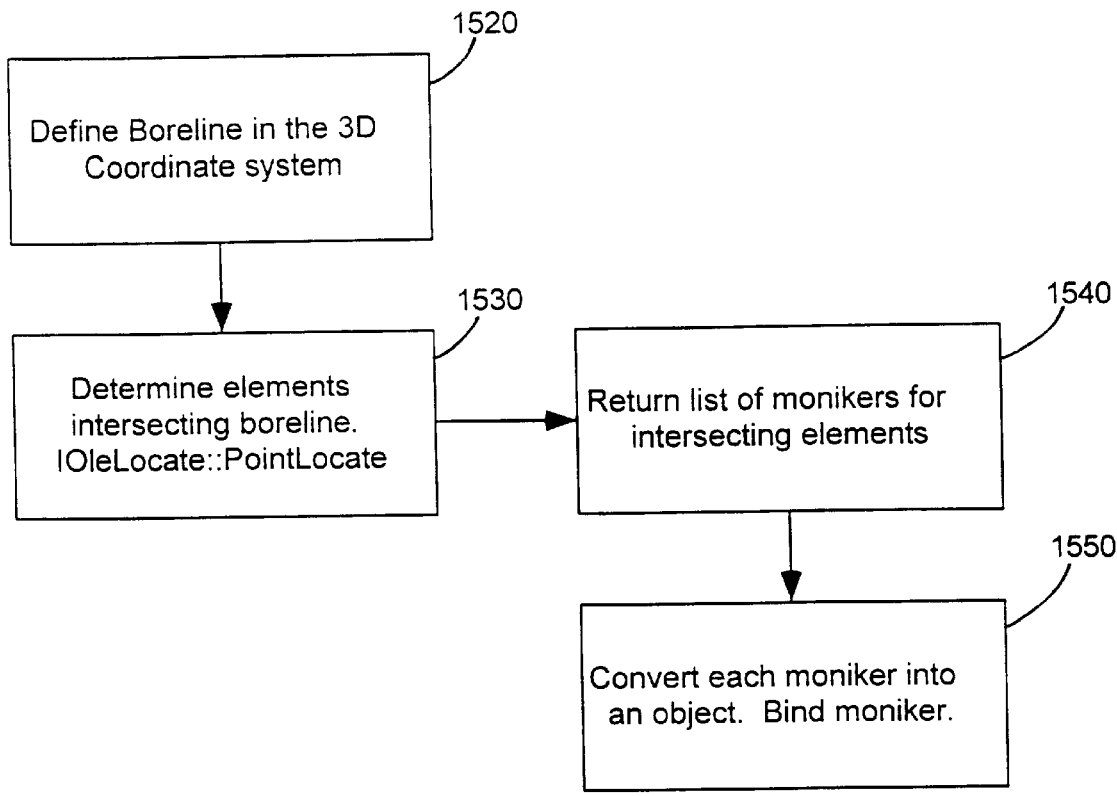
FIG. 32 is a flow diagram of one embodiment of the process of locating elements in an object using the Point-Locate function.

FIG. 32 is a flow diagram of one embodiment of the process of locating elements in an object using the Point-Locate function.

The user first defines a boreline within the container coordinate system (step 1520). Next, IOleLocate:PointLocate is called and the other servers respond to this function by determining what pieces of it (elements) intersect boreline (step 1530). Elements that meet the criteria are returned as a list of monikers (step 1540). (Alternatively, the object can simply return all of its elements.) Once the list of monikers is returned, the server then calls the BindMoniker helper function or IMoniker::BindToObject (described in the appendices) to bind each moniker, i.e., convert each element into an individual object (step 1550). Each new object that intersects the defined boreline can then be used by the server for any purpose.

Figure 34A:
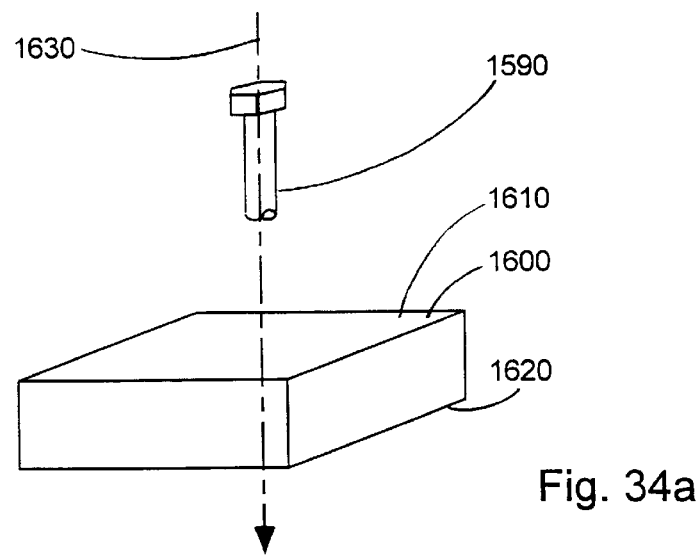
FIGS. 34a–34c illustrate the use of the IoleLocate::Point-Locate function.
Figure 34B:
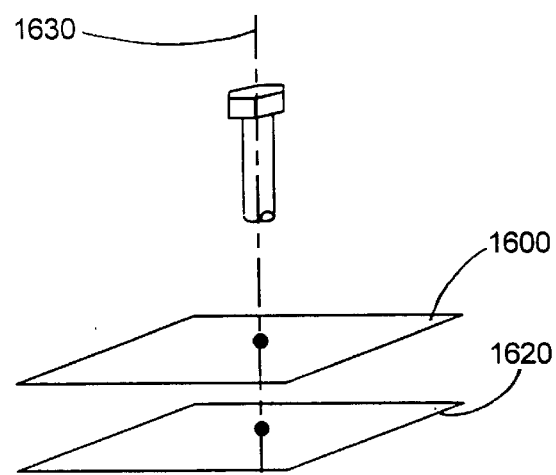
Figure 34C:
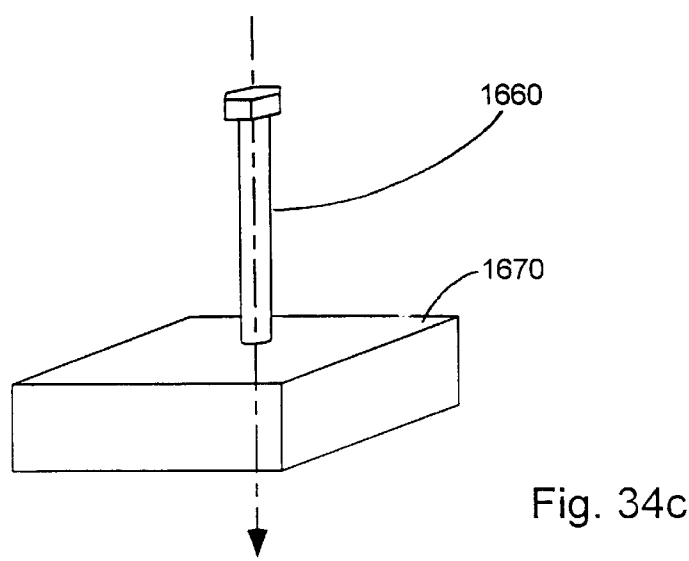

FIGS. 34a–34c illustrate the use of the IOleLocate::PointLocate function. FIG. 34a includes a first object 1590, a bolt, a second object 1600, a block with surface 1610 and 1620, and a boreline 1630. FIG. 34b includes a first object 1640 and a second object 1650. FIG. 34c includes a modified first object 1660, a bolt, and block 1600. Bolt 1590 was created in a first software application and transferred into the container, which created block 1600.

Without the IOleLocate::PointLocate function, bolt 1590 and block 1600 are simply within the container without any knowledge of other each other. With the IOleLocate::PointLocate function, bolt 1590, for example, receives information regarding other objects in the container. As illustrated in FIG. 34a, if the user wants to extend the length of bolt 1590 until it touches block 1600, the user first defines boreline 1630 along the axis of bolt 1590. The server then calls IOleLocate::PointLocate, as disclosed in FIG. 32. As illustrated in FIG. 34a, boreline intersects with surfaces 1610 and 1620 of block 1600, thus the IOleLocate::PointLocate function returns monikers for these surfaces. As illustrated in FIG. 34b, each moniker is then converted into first object 1640 and second object 1650. Since the server now knows the coordinates of first object 1640 and second object 1650, the user can extend the length of bolt 1590 until modified bolt 1660 touches block 1600, as illustrated in FIG. 34c.

The following is a description of the preferred embodiment of the formal PointLocate interface:

```
IOleLocate::PointLocate
HRESULT IOleLocate:: PointLocate   (LPBORELINE pBoreLine, LPENUMMONIKER*
                                    ppEnumMoniker)
```

Gets a list of all elements of an object that intersect with a point or a boreline

| Argument | Type | Description |
| --- | --- | --- |
| pBoreLine | LPBORELINE | Point + depth information to define a sphere or a cylinder used for the intersection criteria. This is a pointer to a boreline structure. |
| ppEnumMoniker | LPENUMMONIKER* | Moniker enumerator. Each element located is a moniker. |
| return value | S_OK | The operation was successful |
| E_OUTOFMEMORY | | Out of memory. |
| E_INVALIDARG | | One of the arguments is invalid. |
| E_UNEXPECTED | | An unexpected error happened. |

Return an enumerator of monikers. This moniker can be converted to a DataObject.

3.2 IOlLocate:ShapeLocate

The second IOleLocate function ShapeLocate allows a server to obtain a list of "elements" in another object that intersect to a user defined shape in space.

Figure 33:
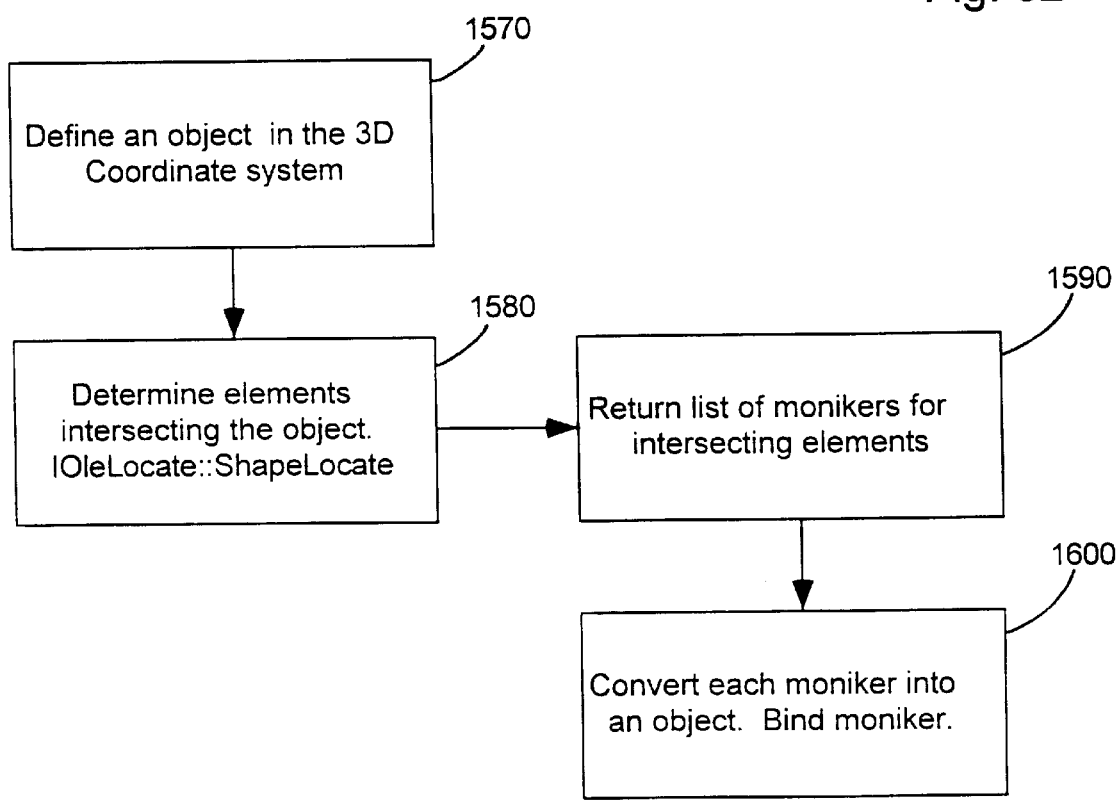
FIG. 33 is a flow diagram of one embodiment of the process of locating elements in an object using the Shape-Locate function.

FIG. 33 is a flow diagram of one embodiment of the process of locating elements in an object using the Shape-Locate function.

The user first defines a shape within the container coordinate system (step 1570). Next, IOleLocate:ShapeLocate is called and the other servers respond to this function by determining what pieces of it (elements) intersect the boreline (step 1580). Elements that meet the criteria are returned as a list of monikers (step 1590). (Alternatively, the object can simply return all of its elements.) Once the list of monikers is returned, the server then calls the BindMoniker helper function or IMoniker::BindToObject to bind each moniker, i.e., convert each element into an individual object (step 1600). Each object that intersects the defined shape and can be used by the server for any purpose. In operation, the IOleLocate::ShapeLocate function operates in the same manner as illustrated in FIGS. 34*a*–34*c*.

The following is a description of the preferred embodiment of the formal ShapeLocate interface:

```
IOleLocate::ShapeLocate
HRESULT IOleLocate::ShapeLocate    (LPSHAPE pShape,
                                    LPENUMMONIKER*
                                    ppEnumMoniker)
```

Gets a list of all elements intersecting/contained by a shape.

| Argument | Type | Description |
| --- | --- | --- |
| pShape | LPSHAPE | Shape defined by a set of points defining a polygon, a depth and an attribute specifying the position of the object relative to this shape. |
| ppEnumMoniker | LPENUMMONIKER* | Moniker enumerator. Each element located is a moniker. |
| return value | S_OK | The operation was successful |
| E_OUTOFMEMORY | | Out of memory. |
| E_INVALIDARG | | One of the arguments is invalid. |
| E_UNEXPECTED | | An unexpected error happened. |

Return an enumerator of monikers. This moniker can be converted to a DataObject.

Conclusion

In the foregoing specification, the invention has been described with reference to a specific exemplary embodiments thereof. Many changes, modifications, and additional extensions to OLE facilitating the transfer of three-dimensional specific information from an object created in a first software application to a second software application are readily envisioned and are included within other embodiments of the present invention.

The specification and drawings are, accordingly, to be regarded in an illustrative rather than in a restrictive sense. It will, however, be evident that various modifications and changes may be made thereunto without departing from the broader spirit and scope of the invention as set forth in the claims.

What is claimed is:

1. In a computer system having an object-oriented environment and a computer readable memory, a method for invoking software objects comprising the steps of:

creating an object server in the computer readable memory within a software application program, the object server including data describing an object, an implementation of a two-dimensional interface having two-dimensional interface methods, and an implementation of a three-dimensional interface having three-dimensional interface methods, the software application program serving as an object container for the object server; and invoking at least one of the three-dimensional interface methods of the object server with the object container.

2. The method of claim 1, further comprising the step of:

invoking at least one of the two-dimensional interface methods of the object server with the object container.

3. In a computer system having an object-oriented environment and a computer readable memory, a method for invoking software objects, comprising the steps of:

creating an object server in the computer readable memory within a first software application program, the object server including data describing an object, an implementation of a two-dimensional interface having two-dimensional interface methods and an implementation of a three-dimensional interface having three-dimensional interface methods;

retrieving the object server in a second software application program;

invoking at least one of the three-dimensional interface methods of the object server within the second software application program when the second software application program supports the three-dimensional interface; and invoking at least one of the two-dimensional interface methods from the object server within the second software application program.

4. The method of claim 3, wherein:

the second software application program serves as an object container for the object server.

5. The method of claim 3 wherein the one three-dimensional interface method comprises a method for creating a view of the object.

6. The method of claim 3 wherein the one three-dimensional interface method comprises a method for changing an existing view of the object.

7. The method of claim 3 wherein the one three-dimensional interface method comprises a method for deleting an existing view of the object.

8. In a computer system having an object-oriented environment and a physical memory, a method for invoking software objects comprising the steps of:

creating an object server within a first software application program, the object server including data describing an object, and an implementation of a two-dimensional interface having two-dimensional interface methods;

storing the object server in the physical memory;

retrieving the object server in a second software application program, the second software application program supporting the two-dimensional interface and a three-dimensional interface; and invoking at least one of the two-dimensional interface methods of the object server within the second software application program.

9. The method of claim 8 further comprising the step of invoking at least one three-dimensional interface method from the three-dimensional interface methods of the object server within the second software application program.

10. The method of claim 9 wherein the one three-dimensional interface method comprises a method for determining a point on another object that intersects with a defined line.

11. The method of claim 9 wherein the one three-dimensional interface method comprises a method for determining a surface of another object that intersects with a defined line.

12. In a computer system having an object-oriented environment and a computer memory, a method for invoking software objects, comprising the steps of:

creating an object server in the computer memory within a first software application program, the object server including data describing an object, an implementation of a two-dimensional interface having two-dimensional interface methods, and an implementation of a three-dimensional interface having three-dimensional interface methods;

retrieving the object server from the computer memory a second software application program;

activating the first software application program from within the second software application as an object container for the object server; and invoking at least one of the three-dimensional interface methods of the object server with the object container.

13. The method of claim 12 wherein the object container includes a method that indicates that in-place activation is allowed.

14. The method of claim 12 wherein the one three-dimensional interface method includes a method for determining a model matrix between the object server and the object container.

15. The method of claim 12 wherein the one three-dimensional interface method includes a method for enumerating a number of views of the object server in the object container.

16. In a computer system including a memory storage, having an object-oriented environment, a method for invoking software objects, comprising the steps of:

creating an object server in the memory storage within a first software application program, the object server including data describing an object, an implementation of a two-dimensional interface having two-dimensional interface methods, and an implementation of a three-dimensional interface having three-dimensional interface methods;

retrieving the object server in a second software application program; and invoking at least one of the three-dimensional interface methods from the object server within the second software application program, the second software application program serving as an object container for the object server.

17. The method of claim 16, further comprising the step of:

invoking at least one of the two-dimensional interface methods from the object server with the object container.

18. The method of claim 16, wherein the three-dimensional interface methods of the object server include a method for returning extent coordinates for the object, described by the data in the object server, relative to the object container; and wherein the step of invoking comprises the step of:

invoking the method.

19. The method of claim 16, wherein the three-dimensional interface methods of the object server include a method for rendering the object on a display, the object described by the data in the object server; and wherein the step of invoking comprises the step of invoking the method for rendering.

20. An object-oriented environment for invoking software objects on a computer system including a display and a computer readable memory, comprising:

a two-dimensional object class in the computer readable memory comprising:

a two-dimensional method for returning two-dimensional extent coordinates of an object; and a three-dimensional object class in the computer readable memory derived from the two-dimensional object class comprising:

a three-dimensional method for returning three-dimensional extent coordinates of an object.

21. The object-oriented environment of claim 20 further comprising:

an instance of the three-dimensional object class including the two-dimensional method and the three-dimensional method.

22. The object-oriented environment of claim 20 wherein the three-dimensional object class also comprises a three-dimensional method for returning a default view of the object.

23. The object-oriented environment of claim 20 wherein the three-dimensional object class also comprises a three-dimensional method for setting a view of the object.

24. An object-oriented environment for invoking software objects on a computer system including a display, comprising:
- a two-dimensional object class comprising:
  - a method for drawing the object on the display; and
- a three-dimensional object class derived from the two-dimensional object class comprising:
  - a method for rendering the object on the display.

25. The object-oriented environment of claim 24 further comprising:
- an instance of the three-dimensional object class including the two-dimensional method and the three-dimensional method.

26. The object-oriented environment of claim 24 wherein the method for rendering comprises calls to OpenGL functions.

27. In a computer system having an object-oriented environment, a method for invoking an object server created within a first software application program, the object server including data describing an object, an implementation of a two-dimensional interface having two-dimensional interface methods, and an implementation of a three-dimensional interface having three-dimensional interface methods, comprising the steps of:
- retrieving the object server in a second software application program; and
- invoking at least one of the three-dimensional interface methods from the object server within the second software application program, the second software application program serving as an object container for the object server.

28. The method of claim 27 wherein the one three-dimensional interface method comprises a method for drawing the object on a display.

29. The method of claim 27 wherein the one three-dimensional interface method comprises a method for setting a view of the object on a display.

30. The method of claim 27 wherein the one three-dimensional interface method comprises a method for determining objects that intersect with the object.

31. A computer system having an object-oriented environment for invoking software objects comprising:
- means for creating an object server within a first software application program, the object server including data describing an object, an implementation of a two-dimensional interface having two-dimensional interface methods, and an implementation of a three-dimensional interface having three-dimensional interface methods, the first software application program serving as an object container for the object server; and
- means for invoking at least one of the three-dimensional interface methods of the object server with the object container.

32. The computer system of claim 31 further comprising means for invoking at least one of the two-dimensional interface methods of the object server with the object container.

33. The computer system of claim 31 wherein the one three-dimensional interface method comprises a method for setting a view of the object.

34. The computer system of claim 31 wherein the one three-dimensional interface method comprises a method for rendering the object on a display.

35. A computer system including a computer program for invoking software objects, the computer system comprising:
- a computer-readable memory including:
  - code that creates an object server within a software application program, the object server including data describing an object, an implementation of a two-dimensional interface having two-dimensional interface methods, and an implementation of a three-dimensional interface having three-dimensional interface methods, the software application program serving as an object container for the object server; and
  - code that invokes at least one of the three-dimensional interface methods of the object server with the object container.

36. The computer system of claim 35 wherein the computer-readable memory also includes code that invokes at least one of the two-dimensional interface methods of the object server.

37. The computer system of claim 35 wherein the one three-dimensional interface method comprises a method for setting a view of the object.

38. The computer system of claim 35 wherein the one three-dimensional interface method comprises a method for rendering the object on a display.

39. The computer system of claim 35 wherein the one three-dimensional interface method comprises a method for determining objects that intersect with the object.

40. The computer system of claim 35 wherein the one three-dimensional interface method comprises a method for determining locations where objects intersect with the object.

41. A computer system having an object-oriented environment for invoking software objects comprising:
- means for creating an object server within a first software application program, the object server including data describing an object, an implementation of a two-dimensional interface having two-dimensional interface methods and a three-dimensional interface having three-dimensional interface methods;
- means for retrieving the object server in a second software application program;
- means for invoking at least one of the three-dimensional interface methods of the object server within the second software application program when the second software application program supports the three-dimensional interface; and
- means for invoking at least one of the two-dimensional interface methods from the object server within the second software application program.

42. The computer system of claim 41 wherein the one two-dimensional interface method comprises a method for drawing the object on the display.

43. The computer system of claim 41 further comprising means for invoking at least one of the three-dimensional interface methods from the object server within the second software application program.

44. The computer system of claim 43 wherein the one three-dimensional interface method comprises a method for setting a view of the object on a display.

45. The computer system of claim 43 wherein the one three-dimensional interface method comprises a method for rendering the object on a display.

46. The computer system of claim 43 wherein the one three-dimensional interface method comprises a method for determining objects that intersect with the object.

47. The computer system of claim 41 wherein the one two-dimensional interface method comprises a method for drawing the object on the display.

48. The computer system of claim 41 wherein the computer-readable memory also includes code that invokes at least one of the three-dimensional interface methods from the object server.

49. The computer system of claim 48 wherein the one three-dimensional interface method comprises a method for deleting a view of the object on a display.

50. The computer system of claim 48 wherein the one three-dimensional interface method comprises a method for rendering the object on a display.

51. The computer system of claim 48 wherein the one three-dimensional interface method comprises a method for determining objects that intersect with the object.

52. A computer system including a computer program for invoking software objects, the computer system comprising:

a computer-readable memory including:

code that creates an object server within a first software application program, the object server including data describing an object, an implementation of a two-dimensional interface having two-dimensional interface methods and a three-dimensional interface having three-dimensional interface methods;

code that retrieves the object server in a second software application program;

code that invokes at least one of the three-dimensional interface methods of the object server within the second software application program when the second software application program supports the three-dimensional interface; and code that invokes at least one of the two-dimensional interface methods from the object server within the second software application program.

* * * * *